United States Patent
Ozaki et al.

(10) Patent No.: US 11,171,326 B2
(45) Date of Patent: Nov. 9, 2021

(54) POSITIVE ELECTRODE ACTIVE MATERIAL FOR NONAQUEOUS ELECTROLYTE SECONDARY BATTERY, METHOD FOR PRODUCING SAME, AND NONAQUEOUS ELECTROLYTE SECONDARY BATTERY USING SAID POSITIVE ELECTRODE ACTIVE MATERIAL

(71) Applicant: SUMITOMO METAL MINING CO., LTD., Tokyo (JP)

(72) Inventors: Takashi Ozaki, Niihama (JP); Yuki Furuichi, Niihama (JP); Jun Yokoyama, Niihama (JP); Tetsufumi Komukai, Niihama (JP)

(73) Assignee: Sumitomo Metal Mining Co., Ltd.

( * ) Notice: Subject to any disclaimer, the term of this patent is extended or adjusted under 35 U.S.C. 154(b) by 17 days.

(21) Appl. No.: 15/531,595

(22) PCT Filed: Nov. 27, 2015

(86) PCT No.: PCT/JP2015/083368
§ 371 (c)(1),
(2) Date: May 30, 2017

(87) PCT Pub. No.: WO2016/084931
PCT Pub. Date: Jun. 2, 2016

(65) Prior Publication Data
US 2018/0287143 A1    Oct. 4, 2018

(30) Foreign Application Priority Data

Nov. 28, 2014  (JP) .................................. 2014-241788
Oct. 28, 2015  (JP) .................................. 2015-212399

(51) Int. Cl.
*H01M 4/36*    (2006.01)
*C01G 41/00*   (2006.01)
(Continued)

(52) U.S. Cl.
CPC ............ *H01M 4/366* (2013.01); *C01G 41/00* (2013.01); *C01G 41/006* (2013.01); *C01G 53/42* (2013.01);
(Continued)

(58) Field of Classification Search
CPC .... H01M 4/366; H01M 4/364; H01M 4/1391; H01M 4/485; H01M 4/505; H01M 4/525;
(Continued)

(56) References Cited

U.S. PATENT DOCUMENTS

2009/0057137 A1    3/2009  Pitts et al.
2010/0209771 A1    8/2010  Shizuka et al.
(Continued)

FOREIGN PATENT DOCUMENTS

| CN | 103988349 | 8/2014 |
|---|---|---|
| EP | 2 624 342 | 8/2013 |

(Continued)

OTHER PUBLICATIONS

JP-2013125732-A machine English translation (Year: 2013).*
(Continued)

*Primary Examiner* — Ula C Ruddock
*Assistant Examiner* — Matthew W Van Oudenaren
(74) *Attorney, Agent, or Firm* — Gerald E. Hespos; Michael J. Porco; Matthew T. Hespos

(57) ABSTRACT

Provided is a method for producing a positive electrode active material for nonaqueous electrolyte secondary batteries, the method including: a mixing step of obtaining a W-containing mixture of Li metal composite oxide particles represented by the formula: $Li_zNi_{1-x-y}Co_xM_yO_2$ and composed of primary particles and secondary particles formed by aggregation of the primary particles, 2 mass % or more of water with respect to the oxide particles, and a W compound or a W compound and a Li compound, the
(Continued)

W-containing mixture having a molar ratio of the total amount of Li contained in water and the solid W compound or the W compound and the Li compound of 3 to 5 with respect to the amount of W contained therein; and a heat treatment step of heating the W-containing mixture to form lithium tungstate on the surface of the primary particles of the Li metal composite oxide particles.

5 Claims, 4 Drawing Sheets

(51) Int. Cl.
*C01G 53/00* (2006.01)
*H01M 10/0525* (2010.01)
*H01M 4/505* (2010.01)
*H01M 4/525* (2010.01)
*H01M 4/1391* (2010.01)
*H01M 10/052* (2010.01)
*H01M 4/485* (2010.01)
*H01M 4/02* (2006.01)

(52) U.S. Cl.
CPC .......... *C01G 53/50* (2013.01); *H01M 4/1391* (2013.01); *H01M 4/364* (2013.01); *H01M 4/485* (2013.01); *H01M 4/505* (2013.01); *H01M 4/525* (2013.01); *H01M 10/052* (2013.01); *H01M 10/0525* (2013.01); *C01P 2002/20* (2013.01); *C01P 2002/87* (2013.01); *C01P 2004/02* (2013.01); *C01P 2004/03* (2013.01); *C01P 2004/45* (2013.01); *C01P 2004/50* (2013.01); *C01P 2004/61* (2013.01); *C01P 2004/62* (2013.01); *C01P 2004/64* (2013.01); *C01P 2004/80* (2013.01); *C01P 2004/82* (2013.01); *C01P 2004/84* (2013.01); *C01P 2004/88* (2013.01); *C01P 2006/12* (2013.01); *C01P 2006/40* (2013.01); *H01M 2004/028* (2013.01)

(58) Field of Classification Search
CPC .......... H01M 10/052; H01M 10/0525; H01M 2004/028; C01G 41/00; C01G 41/006; C01G 53/42; C01G 53/50; C01P 2004/84; C01P 2004/03; C01P 2004/82; C01P 2004/61; C01P 2004/80; C01P 2004/45; C01P 2004/02; C01P 2004/50; C01P 2004/88; C01P 2004/62; C01P 2004/64; C01P 2004/028; C01P 2002/87; C01P 2002/20; C01P 2006/12; C01P 2006/40
See application file for complete search history.

(56) References Cited

U.S. PATENT DOCUMENTS

| | | | | |
|---|---|---|---|---|
| 2012/0276446 | A1* | 11/2012 | Kawai | C01G 45/1228 429/199 |
| 2013/0309580 | A1 | 11/2013 | Tomura | |
| 2015/0021518 | A1* | 1/2015 | Kokado | B29C 43/003 252/182.1 |
| 2017/0054147 | A1* | 2/2017 | Yokoyama | H01M 4/36 |

FOREIGN PATENT DOCUMENTS

| | | |
|---|---|---|
| JP | 11-16566 | 1/1999 |
| JP | 2005-251716 | 9/2005 |
| JP | 2009-289726 | 12/2009 |
| JP | 2010-40383 | 2/2010 |
| JP | 2013-84395 | 5/2013 |
| JP | 2013-125732 | 6/2013 |
| JP | 2013125732 A * | 6/2013 |
| JP | 2013-152866 | 8/2013 |
| JP | 2013-171785 | 9/2013 |
| WO | 2009/029111 | 3/2009 |
| WO | 2012/105048 | 8/2012 |
| WO | WO-2015163273 A1 * | 10/2015 .............. H01M 4/36 |

OTHER PUBLICATIONS

International Search Report dated Feb. 23, 2016.
Chinese Office Action dated Apr. 25, 2018.
European Search Report dated Jul. 3, 2018.

* cited by examiner

POSITIVE ELECTRODE ACTIVE MATERIAL FOR NONAQUEOUS ELECTROLYTE SECONDARY BATTERY, METHOD FOR PRODUCING SAME, AND NONAQUEOUS ELECTROLYTE SECONDARY BATTERY USING SAID POSITIVE ELECTRODE ACTIVE MATERIAL

BACKGROUND

1. Field of the Invention

The present invention relates to a positive electrode active material for nonaqueous electrolyte secondary batteries and a production method thereof, and a nonaqueous electrolyte secondary battery using the positive electrode active material.

2. Description of the Related Art

In recent years, with the wide adoption of portable electronic devices such as mobile phones and laptop computers, the development of small and lightweight nonaqueous electrolyte secondary batteries having high energy density is strongly desired. Further, the development of high power secondary batteries as batteries for electric cars including hybrid cars is strongly desired.

Examples of the secondary batteries satisfying such demands include lithium ion secondary batteries.

Such lithium ion secondary batteries are composed of a negative electrode, a positive electrode, an electrolyte, etc., and materials capable of intercalation and deintercalation of lithium ions are used for the active materials of the negative electrode and the positive electrode. The lithium ion secondary batteries are now being actively studied and developed. Above all, lithium ion secondary batteries using a layered or spinel lithium-metal composite oxide as a positive electrode material allow a high voltage of 4-V class to be obtained, and therefore are being put into practical use as batteries having high energy density.

Main examples of materials proposed so far include lithium cobalt composite oxide ($LiCoO_2$) that is comparatively easily synthesized, lithium nickel composite oxide ($LiNiO_2$) using nickel that is less expensive than cobalt, lithium nickel cobalt manganese composite oxide ($LiNi_{1/3}Co_{1/3}Mn_{1/3}O_2$), and lithium manganese composite oxide ($LiMn_2O_4$) using manganese.

Among these, lithium nickel composite oxide is gaining attention as a material that allows high battery capacity to be obtained. Further, a resistance reduction that is necessary for power enhancement is regarded as being important in recent years.

As a method for achieving the aforementioned resistance reduction, addition of different elements is used, and transition metals capable of having high valence such as W, Mo, Nb, Ta, and Re are considered to be useful, in particular.

For example, Japanese Patent Laid-Open No. 2009-289726 proposes a lithium transition metal compound powder for lithium secondary battery positive electrode materials containing one or more elements selected from Mo, W, Nb, Ta, and Re in an amount of 0.1 to 5 mol % with respect to the total molar amount of Mn, Ni, and Co, where the total atomic ratio of Mo, W, Nb, Ta, and Re with respect to the total of Li and the metal elements other than Mo, W, Nb, Ta, and Re on the surface portions of primary particles is preferably 5 times or more the atomic ratio of the whole primary particles.

According to this proposal, the cost reduction, high safety, high load characteristics, and improvement in powder handleability of the lithium transition metal compound powder for lithium secondary battery positive electrode materials can be achieved all together.

However, the aforementioned lithium transition metal compound powder is obtained by pulverizing a raw material in a liquid medium, spray drying a slurry in which the pulverized materials are uniformly dispersed, and firing the obtained spray-dried material. Therefore, some of different elements such as Mo, W, Nb, Ta, and Re are substituted with Ni disposed in layers, resulting in a reduction in battery characteristics such as battery capacity and cycle characteristics, which has been a problem.

Further, Japanese Patent Laid-Open No. 2005-251716 proposes a positive electrode active material for nonaqueous electrolyte secondary batteries having at least a lithium transition metal composite oxide with a layered structure, wherein the lithium transition metal composite oxide is present in the form of particles composed of either or both of primary particles and secondary particles as aggregates of the primary particles, and wherein the particles have a compound including at least one selected from the group consisting of molybdenum, vanadium, tungsten, boron, and fluorine at least on the surface.

With that, it is claimed that the positive electrode active material for nonaqueous electrolyte secondary batteries having excellent battery characteristics even in more severe use environment is obtained, and that the initial characteristics are improved without impairing the improvement in thermostability, load characteristics, and output characteristics particularly by having the compound including at least one selected from the group consisting of molybdenum, vanadium, tungsten, boron, and fluorine on the surface of the particles.

However, the effect by adding the at least one element selected from the group consisting of molybdenum, vanadium, tungsten, boron, and fluorine is to improve the initial characteristics, that is, the initial discharge capacity and the initial efficiency, where the output characteristics are not mentioned. Further, according to the disclosed production method, the firing is performed while the additive element is mixed with a heat-treated hydroxide together with a lithium compound, and therefore the additive element is partially substituted with nickel disposed in layers to cause a reduction in battery characteristics, which has been a problem.

Further, Japanese Patent Laid-Open No. H11-16566 proposes a positive electrode active material in which the circumference of the positive electrode active material is coated with a metal containing at least one selected from Ti, Al, Sn, Bi, Cu, Si, Ga, W, Zr, B, and Mo and/or an intermetallic compound obtained by combining a plurality of these elements, and/or an oxide.

It is claimed that such coating can ensure the safety by absorbing oxygen gas, but there is no disclosure on the output characteristics. Further, the disclosed production method involves coating using a planetary ball mill, and such a coating method causes physical damage on the positive electrode active material, resulting in a reduction in battery characteristics.

Further, Japanese Patent Laid-Open No. 2010-40383 proposes a positive electrode active material heat-treated while a tungstate compound is deposited on composite oxide particles mainly composed of lithium nickelate and having a carbonate ion content of 0.15 weight % or less.

According to this proposal, since the tungstate compound or a decomposition product of the tungstate compound is present on the surface of the positive electrode active material, and the oxidation activity on the surface of the composite oxide particles during charge is suppressed, gas generation due to the decomposition of the nonaqueous electrolyte or the like can be suppressed, but there is no disclosure on the output characteristics.

Further, the disclosed production method is to deposit a solution in which a sulfuric acid compound, a nitric acid compound, a boric acid compound, or a phosphate compound serving as a deposition component is dissolved in a solvent together with the tungstate compound, on the composite oxide particles that are preferably heated to at least the boiling point of the solution in which the deposition component is dissolved, where the solvent is removed within a short time, and therefore the tungsten compound is not sufficiently dispersed on the surface of the composite oxide particles and is not uniformly deposited, which has been a problem.

Further, improvements in power enhancement by lithium nickel composite oxide have been made. For example, Japanese Patent Laid-Open No. 2013-125732 proposes a positive electrode active material for nonaqueous electrolyte secondary batteries having fine particles containing lithium tungstate represented by any one of $Li_2WO_4$, $Li_4WO_5$, and $Li_6W_2O_9$ on the surface of a lithium-metal composite oxide composed of primary particles and secondary particles formed by aggregation of the primary particles, where high power is supposed to be obtained together with high capacity. Although the power is enhanced while the high capacity is maintained, further enhancement in capacity is required.

In view of such problems, it is an object of the present invention to provide a positive electrode active material for nonaqueous electrolyte secondary batteries which allows higher power together with high capacity to be obtained when used as a positive electrode material, while suppressing an increase in gas generation.

SUMMARY

As a result of diligent studies on the powder characteristics of lithium-metal composite oxide used as a positive electrode active material for nonaqueous electrolyte secondary batteries and the effect thereof on the output characteristics of the battery, for solving the aforementioned problems, the inventors have found that the positive electrode resistance of the positive electrode active material can be reduced and the output characteristics of the battery can be improved by forming lithium tungstate having a specific form on the surface of the primary particles and the secondary particles constituting the lithium-metal composite oxide. Further, as a production method thereof, they have found that the form of lithium tungstate can be controlled by heat-treating a mixture controlled to have a specific ratio of lithium and tungsten other than the lithium-metal composite oxide particles, thereby accomplishing the present invention.

More specifically, the first aspect of the present invention is a method for producing a positive electrode active material for nonaqueous electrolyte secondary batteries, including: a mixing step of obtaining a tungsten-containing mixture of a lithium-metal composite oxide powder represented by the general formula: $Li_zNi_{1-x-y}Co_xM_yO_2$ (where $0<x\leq0.35$, $0\leq y\leq0.35$, and $0.95\leq z\leq1.30$ are satisfied, and M is at least one element selected from Mn, V, Mg, Mo, Nb, Ti, and Al) and having a layered crystal structure constituted by primary particles and secondary particles formed by aggregation of the primary particles, 2 mass % or more of water with respect to the lithium-metal composite oxide powder, and a tungsten compound or a tungsten compound and a lithium compound, the tungsten-containing mixture having a molar ratio of a total amount of lithium contained in the water and the tungsten compound as a solid component, or in the water, and the tungsten compound and the lithium compound as a solid component of 3 to 5, with respect to an amount of tungsten contained therein; and a heat treatment step of heating the obtained tungsten-containing mixture to form lithium tungstate on a surface of the primary particles of the lithium-metal composite oxide.

The second aspect of the present invention is the method for producing a positive electrode active material for nonaqueous electrolyte secondary batteries according to the first aspect, further including, prior to the mixing step: a water washing step of washing the lithium-metal composite oxide powder with water by mixing the lithium-metal composite oxide powder with the water to form a slurry; and a solid-liquid separation step of performing solid-liquid separation subsequently to the water washing step.

The third aspect of the present invention is the method for producing a positive electrode active material for nonaqueous electrolyte secondary batteries according to the second aspect, wherein the lithium-metal composite oxide powder is contained in the slurry at a concentration of 200 to 5000 g per 1 L of water.

The fourth aspect of the present invention is the method for producing a positive electrode active material for nonaqueous electrolyte secondary batteries according to the second aspect and the third aspect, wherein the tungsten-containing mixture is obtained by adding the tungsten compound at least during the water washing step or after the solid-liquid separation step.

The fifth aspect of the present invention is the method for producing a positive electrode active material for nonaqueous electrolyte secondary batteries according to the fourth aspect, wherein the slurry is formed by mixing the lithium-metal composite oxide powder with an aqueous solution of the tungsten compound in the water washing step.

The sixth aspect of the present invention is the method for producing a positive electrode active material for nonaqueous electrolyte secondary batteries according to the fourth aspect, wherein the tungsten compound is in powder form.

The seventh aspect of the present invention is the method for producing a positive electrode active material for nonaqueous electrolyte secondary batteries according to the first aspect to the sixth aspect, wherein the heat treatment is performed at 100 to 600° C.

The eighth aspect of the present invention is the method for producing a positive electrode active material for nonaqueous electrolyte secondary batteries according to the first aspect to the seventh aspect, wherein an amount of tungsten contained in the tungsten-containing mixture is adjusted to 0.05 to 2.0 at % with respect to the total number of atoms of Ni, Co, and M contained in the lithium-metal composite oxide powder.

The ninth aspect of the present invention is a positive electrode active material for nonaqueous electrolyte secondary batteries composed of a lithium-metal composite oxide powder having a layered crystal structure constituted by primary particles and secondary particles formed by aggregation of the primary particles, wherein the positive electrode active material is represented by the general formula: $Li_zNi_{1-x-y}Co_xM_yW_aO_{2+\alpha}$ (where $0<x\leq0.35$, $0\leq y\leq0.35$, $0.95\leq z\leq1.30$, $0<a\leq0.03$, and $0\leq\alpha\leq0.15$ are satisfied, and M is at least one element selected from Mn, V, Mg, Mo, Nb, Ti, and Al) and has lithium tungstate on a surface of the primary particles of the lithium-metal composite oxide, and $Li_4WO_5$ is contained in the lithium tungstate at a proportion of 50 to 90 mol %.

The tenth aspect of the present invention is the positive electrode active material for nonaqueous electrolyte secondary batteries according to the ninth aspect, wherein lithium is contained in the lithium compound other than the lithium tungstate present on a surface of the lithium-metal composite oxide in an amount of 0.08 mass % or less with respect to the total amount of the positive electrode active material.

The eleventh aspect of the present invention is the positive electrode active material for nonaqueous electrolyte secondary batteries according to the ninth and the tenth aspect, wherein tungsten is contained in the lithium tungstate an amount of 0.05 to 2.0 at % as the number of W atoms with respect to the total number of atoms of Ni, Co, and M contained in the lithium-metal composite oxide.

The twelfth aspect of the present invention is the positive electrode active material for nonaqueous electrolyte secondary batteries according to the ninth aspect to the eleventh aspect, wherein the lithium tungstate is present on the surface of the primary particles of the lithium-metal composite oxide as fine particles having a particle size of 1 to 200 nm.

The thirteenth aspect of the present invention is the positive electrode active material for nonaqueous electrolyte secondary batteries according to the ninth aspect to the eleventh aspect, wherein the lithium tungstate is present on the surface of the primary particles of the lithium-metal composite oxide as a coating film having a film thickness of 1 to 150 nm.

The fourteenth aspect of the present invention is the positive electrode active material for nonaqueous electrolyte secondary batteries according to the ninth aspect to the eleventh aspect, wherein the lithium tungstate is present on the surface of the primary particles of the lithium-metal composite oxide in both forms of fine particles having a particle size of 1 to 200 nm and a coating film having a film thickness of 1 to 150 nm.

The fifteenth aspect of the present invention is a nonaqueous electrolyte secondary battery having a positive electrode including the positive electrode active material for nonaqueous electrolyte secondary batteries according to the ninth aspect to fourteenth aspect.

According to the present invention, a positive electrode active material for nonaqueous electrolyte secondary batteries capable of achieving high power together with high capacity, while the gas generation is reduced when used as a positive electrode material of a battery is obtained.

Further, the production method is easy and suitable for production on an industrial scale, and the industrial value thereof is exceptionally large.

DETAILED DESCRIPTION

Figure 1:
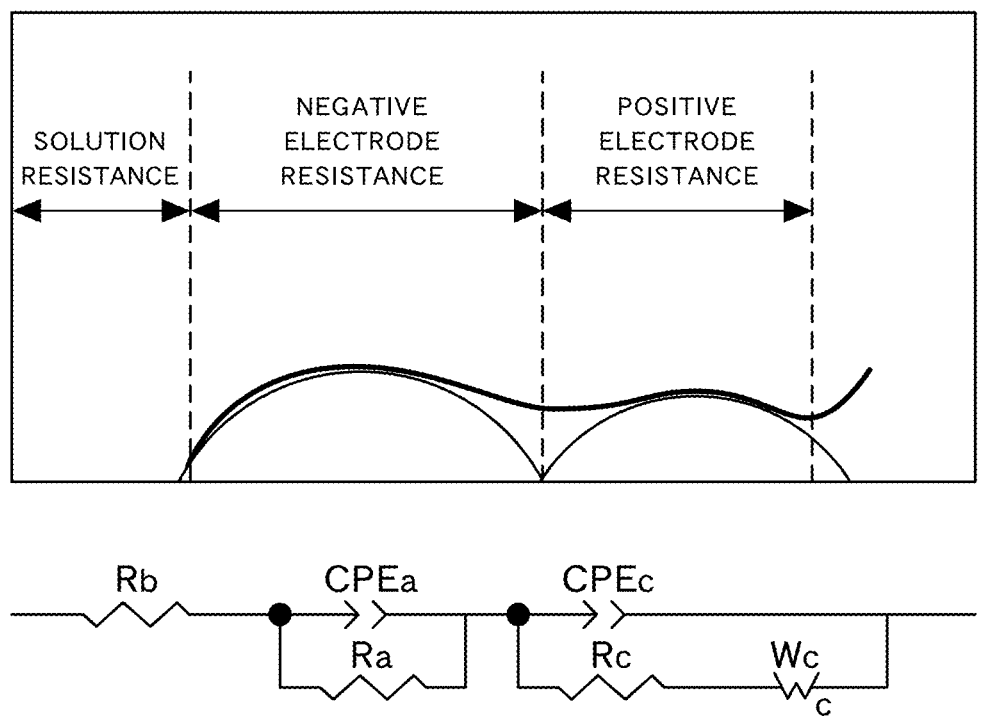
FIG. 1 is a schematic illustration of an equivalent circuit used for measurement examples of impedance evaluation and analysis.

Hereinafter, for the present invention, a positive electrode active material of the present invention will be first described, and thereafter a production method thereof and a nonaqueous electrolyte secondary battery using the positive electrode active material of the present invention will be described.

(1) Positive Electrode Active Material

The positive electrode active material for nonaqueous electrolyte secondary batteries of the present invention is composed of a lithium-metal composite oxide having a layered crystal structure constituted by primary particles and secondary particles formed by aggregation of the primary particles, wherein the positive electrode active material has a composition represented by the formula: $Li_zNi_{1-x-y}Co_xM_yW_aO_{2+\alpha}$ (where $0<x\leq0.35$, $0\leq y\leq0.35$, $0.95\leq z\leq1.30$, $0<a\leq0.03$, and $0\leq\alpha\leq0.15$ are satisfied, and M is at least one element selected from Mn, V, Mg, Mo, Nb, Ti, and Al) and has lithium tungstate on surface of the primary particles of the lithium-metal composite oxide, and $Li_4WO_5$ is contained in the lithium tungstate at a proportion of 50 to 90 mol %.

In the present invention, high charge-discharge capacity is obtained by using the lithium-metal composite oxide represented by the formula $Li_zNi_{1-x-y}Co_xM_yO_2$ (where $0<x\leq0.35$, $0\leq y\leq0.35$, and $0.95\leq z\leq1.30$ are satisfied, and M is at least one element selected from Mn, V, Mg, Mo, Nb, Ti, and Al) as a base material. For obtaining higher charge-discharge capacity, $x+y\leq0.2$ and $0.95\leq z\leq1.10$ are preferably satisfied in the aforementioned formula. In the case where high thermal stability is required, $x+y>0.2$ is preferably satisfied.

Further, the base material is in the form of a lithium-metal composite oxide powder constituted by primary particles and secondary particles formed by aggregation of the primary particles (hereinafter, the secondary particles and the primary particles existing alone may be referred to collectively as "lithium-metal composite oxide particles"), and $Li_4WO_5$ is contained in the lithium tungstate formed on the surface of the primary particles (which will be hereinafter referred to as the proportion of $Li_4WO_5$) at a proportion of 50 to 90 mol %, thereby improving the output characteristics while suppressing an increase in gas generation and maintaining the charge-discharge capacity.

Generally, when the surface of the positive electrode active material is completely coated with a different compound, the movement (intercalation) of lithium ions is significantly limited, and therefore high capacity that is an advantage of lithium nickel composite oxide is eventually offset.

In contrast, in the present invention, lithium tungstate is formed on the surface of the lithium-metal composite oxide particles and the surface of the primary particles thereinside, and the lithium tungstate has high lithium ion conductivity and has an effect of promoting the movement of lithium ions. Therefore, the aforementioned lithium tungstate is formed on the surface of the primary particles of the lithium-metal composite oxide particles, thereby forming Li conduction paths at the interface with the electrolyte, so that the reaction resistance of the positive electrode active material (which may be hereinafter referred to as positive electrode resistance) is reduced to improve the output characteristics of the battery.

Thus, the reduction in positive electrode resistance reduces the voltage to be lost in the battery, and the voltage actually applied to the load side is relatively increased, thereby allowing high power to be obtained. Further, the increase in the voltage applied to the load side allows lithium to be sufficiently inserted into and removed from the positive electrode, and therefore the charge-discharge capacity of the battery (which may be hereinafter referred to as "battery capacity") is also improved.

Here, it is important to adjust the proportion of $Li_4WO_5$ in the lithium tungstate to 50 to 90 mol %.

More specifically, the lithium tungstate may have a number of presence forms such as $Li_2WO_4$, $Li_4WO_5$, and $Li_6W_2O_9$, among which $Li_4WO_5$ has high lithium ion conductivity, and the presence of $Li_4WO$ on the surface of the primary particles reduces the reaction resistance of the positive electrode active material more significantly, thereby allowing a more significant effect of improving the output characteristics to be obtained. Further, the reduction in positive electrode resistance also enables the battery capacity to be improved.

However, when the lithium tungstate consists of $Li_4WO_5$ only, the gas generation when the battery is stored at high temperature increases, and therefore a safety problem occurs. The details of the cause of the increase in gas generation are unknown, but it is probably because Li of $Li_4WO_5$ is easily dissociated in a solvent, particularly, water.

Accordingly, the proportion of $Li_4WO_5$ is set to 50 to 90 mol %, preferably 50 to 80 mol %, in the present invention, thereby allowing the significant effect of reducing the reaction resistance to be obtained while suppressing the increase in gas generation.

Meanwhile, since $Li_2WO_4$ has high lithium ion conductivity, though it is not as high as that of $Li_4WO_5$, and is less likely to be dissociated in water, the effect of suppressing the increase in gas generation when the battery is stored at high temperature battery is high.

Accordingly, it is preferable that the proportion of $Li_2WO_4$ contained in the lithium tungstate formed on the surface of the primary particles (which will be hereinafter referred to as the proportion of $Li_2WO_4$) be set to 10 to 50 mol %, and the proportion of the total of $Li_4WO_5$ and $Li_2WO_4$ be set to 90 mol % or more. This situation allows the significant effect of reducing the reaction resistance to be obtained, while further suppressing the increase in gas generation.

The form of the lithium tungstate may be determined by any method as long as the form can be specified in terms of molar ratio and can be determined by an instrumental analysis using X-ray or electron beam. Further, it may be calculated by pH titration analysis using hydrochloric acid.

Further, the contact with the electrolyte occurs on the surface of the primary particles, and therefore it is important that the lithium tungstate (which may be hereinafter referred to as "LWO") be formed on the surface of the primary particles. Here, the surface of the primary particles in the present invention includes the surface of the primary particles exposed on the outer surface of the secondary particles, and the surface of the primary particles communicating with the outside of the secondary particles so as to allow the electrolyte to penetrate therethrough and exposed into voids in the vicinity of the surface of the secondary particles and inside thereof. Further, the surface of the primary particles includes even the grain boundaries between the primary particles if the primary particles are not perfectly bonded, and the electrolyte can penetrate therethrough.

The contact with the electrolyte occurs not only on the outer surface of the secondary particles formed by aggregation of the primary particles but also in the voids between the primary particles in the vicinity of the surface of the secondary particles and inside thereof and further at the aforementioned imperfect grain boundaries, and therefore it is necessary to form LWO also on the surface of the primary particles to promote the movement of lithium ions. Accordingly, the reaction resistance of the positive electrode active material can be further reduced by forming LWO more on the surface of the primary particles which can contact with the electrolyte.

Further, as the form of LWO on the surface of the primary particles, when the surface of the primary particles is coated with layered materials, the contact area with the electrolyte is reduced. When such layered materials are formed, the formation of the compound tends to concentrate on the surface of some specific primary particles. Since the layered materials as coating materials have high lithium ion conductivity, the effects of improving the charge-discharge capacity and reducing the positive electrode resistance are obtained, but they are not sufficient, leaving room for improvement.

Accordingly, for obtaining higher effect, LWO is preferably present on the surface of the primary particles of the lithium-metal composite oxide as fine particles having a particle size of 1 to 200 nm.

The contact area with the electrolyte is rendered sufficient by having such a form, so that the lithium ion conductivity can be effectively improved, thereby allowing the positive electrode resistance to be more effectively reduced and the charge-discharge capacity to be improved. When the particle size is less than 1 nm, the fine particles may fail to have sufficient lithium ion conductivity in some cases. Further, when the particle size is over 200 nm, the formation of the fine particles on the surface of the primary particles is made non-uniform, which may result in failure to obtain a higher effect of reducing the positive electrode resistance in some cases.

Here, the fine particles are not necessarily completely formed on the entire surface of the primary particles and may be scattered. Even when scattered, the effect of reducing the reaction resistance of the positive electrode is obtained as long as the fine particles are formed on the outer surface of the lithium-metal composite oxide particles and the surface of the primary particles thereinside.

Further, not all of the fine particles are necessarily present as fine particles having a particle size of 1 to 200 nm, and a high effect is obtained when 50% or more of the number of the fine particles formed on the surface of the primary particles are preferably formed to have a particle size in the range of 1 to 200 nm.

Meanwhile, when the surface of the primary particles is coated with a thin film, Li conduction paths can be formed at the interface with the electrolyte, while the reduction in specific surface area is suppressed, and higher effects of improving the charge-discharge capacity and reducing the positive electrode resistance are obtained. In the case where the surface of the primary particles are coated with LWO in the form of thin films as above, LWO is preferably present on the surface of the primary particles of the lithium-metal composite oxide as coating films with a film thickness of 1 to 150 nm.

When the film thickness is less than 1 nm, the coating films may fail to have sufficient lithium ion conductivity in some cases. Further, when the film thickness is over 150 nm, the lithium ion conductivity is reduced, which may result in failure to obtain a higher effect of reducing the positive electrode resistance in some cases.

However, such coating film may be partially formed on the surface of the primary particles, and the whole coating film does not need to have a film thickness in the range of 1 to 150 nm. When the coating film with a film thickness of 1 to 150 nm is formed at least partially on the surface of the primary particles, a high effect is obtained.

Further, also in the case where LWO is formed on the surface of the primary particles is the form of fine particles as well as in the form of a coating thin film, a high effect on the battery characteristics is obtained.

Meanwhile, in the case where the lithium tungstate is non-uniformly formed between the lithium-metal composite oxide particles, the movement of lithium ions between the lithium-metal composite oxide particles is rendered non-uniform, and therefore a load is applied onto some specific lithium-metal composite oxide particles, which tends to cause a deterioration in cycle characteristics and output characteristics.

Accordingly, the lithium tungstate is preferably uniformly formed also between the lithium-metal composite oxide particles.

Such properties of the surface of the primary particles of the lithium-metal composite oxide can be determined, for example, by observation using a field emission scanning electron microscope (SEM), and it has been confirmed that the lithium tungstate is formed on the surface of the primary particles composed of the lithium-metal composite oxide in the positive electrode active material for nonaqueous electrolyte secondary batteries of the present invention.

Accordingly, the amount of the lithium tungstate formed is necessary to be sufficient to reduce the reaction resistance and ensure a sufficient surface area of the primary particles to contact with the electrolyte.

Lithium is contained in lithium compounds other than the lithium tungstate present on the surface of the lithium-metal composite oxide particles (which will be hereinafter referred to as excess amount of lithium) in an amount of preferably 0.08 mass % or less, more preferably 0.05 mass % or less, with respect to the total amount of the positive electrode active material.

When the excess amount of lithium is 0.08 mass % or less, gas generation at high temperature can be more effectively suppressed.

More specifically, lithium hydroxide and lithium carbonate are present, other than the lithium tungstate, on the surface of the primary particles of the lithium-metal composite oxide, and gas generation that occurs due to lithium hydroxide and lithium carbonate during storage of the battery at high temperature can be more effectively suppressed by controlling the excess amount of lithium present on the surface of the lithium-metal composite oxide.

Further, tungsten is contained in the lithium tungstate in an amount of 3.0 at % or less, preferably 0.05 to 2.0 at %, with respect to the total number of atoms of Ni, Co, and M contained in the lithium-metal composite oxide. This allows the effect of improving the output characteristics to be obtained. Further, the amount of tungsten of 0.05 to 2.0 at % allows the amount of LWO formed to be sufficient to reduce the positive electrode resistance and allows it to be sufficient to ensure the surface of the primary particles which can contact with the electrolyte, so that both high charge-discharge capacity and high output characteristics can be further achieved.

When the amount of tungsten is less than 0.05 at %, the effect of improving the output characteristics may fail to be sufficiently obtained, and when the amount of tungsten is over 3.0 at %, the amount of lithium tungstate formed excessively increases to inhibit the conduction of lithium ions between the lithium-metal composite oxide and the electrolyte, which may result in a reduction in charge-discharge capacity.

Further, the amount of lithium in the entire positive electrode active material increases by the amount of lithium contained in the lithium tungstate, where the atomic ratio "Li/Me" of the number of atoms of Li with respect to the sum of the number of atoms of Ni, Co, and M in the positive electrode active material (Me) is 0.95 to 1.30, preferably 0.97 to 1.25, more preferably 0.97 to 1.20. Thus, the ratio Li/Me in the lithium-metal composite oxide particles as a core material is set to preferably 0.95 to 1.25, more preferably 0.95 to 1.20, thereby allowing high battery capacity to be obtained and allowing the amount of lithium that is sufficient to form a LW compound to be ensured. For obtaining higher battery capacity, the ratio Li/Me in the entire positive electrode active material is set to 0.95 to 1.15, and the ratio Li/Me in the lithium-metal composite oxide particles is further preferably set to 0.95 to 1.10. Here, the core material is the lithium-metal composite oxide particles excluding the LW compound, and the positive electrode active material is obtained therefrom by forming the LW compound on the surface of the primary particles of the lithium-metal composite oxide particles.

When the ratio Li/Me is less than 0.95, the reaction resistance of the positive electrode in the nonaqueous electrolyte secondary battery using the obtained positive electrode active material increases, and thus the output of the battery decreases. Further, when the ratio Li/Me is over 1.30, the initial discharge capacity of the positive electrode active material decreases, and the reaction resistance of the positive electrode increases as well.

The positive electrode active material of the present invention has improved output characteristics by forming lithium tungstate on the surface of the primary particles of the lithium-metal composite oxide, and the powder characteristics as the positive electrode active material such as particle size and tap density may fall within the range of those of commonly used positive electrode active materials.

(2) Method for Producing Positive Electrode Active Material

Hereinafter, a method for producing the positive electrode active material for nonaqueous electrolyte secondary batteries of the present invention will be described in detail for each step.

[Mixing Step]

The mixing step is a step of obtaining a tungsten-containing mixture of a lithium-metal composite oxide powder having a layered crystal structure constituted by primary particles and secondary particles formed by aggregation of the primary particles, 2 mass % or more of water with respect to the lithium-metal composite oxide powder, and a tungsten compound or a tungsten compound and a lithium compound, wherein the molar ratio (which will be hereinafter referred to as Li molar ratio) of the total amount of lithium (Li) contained in the water and the solid tungsten compound or the water, the solid tungsten compound, and the solid lithium compound, with respect to the content of tungsten (W) is 3 to 5.

The amount of the water with respect to the lithium-metal composite oxide powder in the tungsten-containing mixture (which will be hereinafter referred to simply as mixture) is 2 mass % or more. This allows tungsten contained in the tungsten compound to penetrate into the voids between the primary particles communicating with the outside of the secondary particles and into the imperfect grain boundaries together with the water and allows a sufficient amount of W to be dispersed on the surface of the primary particles. The amount of the water needs only to be 2 mass % or more, but when the amount of the water is excessively large, the efficiency of the heat treatment in the subsequent step decreases, or the elution of lithium from the lithium-metal composite oxide particles increases, which may result in an excessively high Li molar ratio in the mixture and a deterioration in battery characteristics when the positive electrode active material to be obtained is used as a positive electrode of a battery. Therefore, the amount of the water is preferably 20 mass % or less, more preferably 3 to 15 mass %, further preferably 3 to 10 mass %.

When the amount of the water falls within the aforementioned range, the pH is raised due to the lithium eluted in the water, and an effect of suppressing the elution of excess lithium is exerted. The molar ratio of Co and M in the lithium-metal composite oxide powder is maintained also in the positive electrode active material.

The tungsten compound to be used is preferably soluble in the water contained in the mixture so as to penetrate to the surface of the primary particles inside the secondary particles. Thus, the tungsten compound to be used includes a tungsten compound in the form of an aqueous solution.

The tungsten compound present in the form of an aqueous solution needs only to be present in an amount that allows the penetration to the surface of the primary particles inside the secondary particles, and therefore the tungsten compound in solid form may be partially mixed. Further, even if the compound is difficult to dissolve in the water at room temperature, the compound needs only to be dissolved in the water when heated in the heat treatment. Further, the water in the mixture becomes alkaline depending on the lithium to be contained, and therefore the compound may be capable of being dissolved under an alkaline condition.

In this way, the tungsten compound is not limited as long as it is capable of being dissolved in the water, but tungsten oxide, lithium tungstate, ammonium tungstate, and sodium tungstate, for example, are preferable, and tungsten oxide, lithium tungstate, and ammonium tungstate with a low possibility of contamination are more preferable, and tungsten oxide and lithium tungstate are further preferable.

The Li molar ratio of this mixture is set to 3.0 or more and 5.0 or less.

Thereby, the proportion of $Li_4WO_5$ in the positive electrode active material to be obtained can be adjusted to 50 to 90 mol %. When the Li molar ratio is less than 3.0, the proportion of $Li_4WO$ falls below 50 mol %, and when the Li molar ratio is over 5.0, the proportion of $Li_4WO_5$ exceeds 90 mol %, and the excess amount of lithium exceeds 0.08 mass % with respect to the total amount of the positive electrode active material.

Therefore, for controlling the proportion of $Li_4WO_5$ and reducing the excess amount of lithium, the Li molar ratio is preferably less than 4.5, more preferably 4.0 or less. Depending on the tungsten compound to be added, the Li molar ratio may fall below 3.0 in some cases. In such a case, the deficit may be made up by adding a lithium compound, and as the lithium compound, a water soluble compound such as lithium hydroxide (LiOH) is preferable.

Further, the amount of tungsten contained in the mixture is preferably 3.0 at % or less, more preferably 0.05 to 2.0 at %, with respect to the total number of atoms of Ni, Co, and M contained in the lithium-metal composite oxide powder. Thereby, the amount of tungsten contained in the lithium tungstate in the positive electrode active material is adjusted to the preferable range, and thus both high charge-discharge capacity and high output characteristics of the positive electrode active material can be further achieved.

In the mixing step, the mixing may be performed by supplying the water together with the tungsten compound so that the content of the water in the mixture is 2 mass % or more, or the mixing may be performed by supplying an aqueous solution of the tungsten compound or separately supplying the tungsten compound and the water.

Meanwhile, in the lithium-metal composite oxide powder obtained by firing the metal composite hydroxide or the metal composite oxide and the lithium compound, an unreacted lithium compound is present on the surface of the secondary particles and the primary particles.

Therefore, there may be a case where the amount of lithium present in the water constituting the mixture excessively increases, and the control of the Li molar ratio may be rendered difficult.

Accordingly, a water washing step of washing with water by mixing the lithium-metal composite oxide powder with water to obtain a slurry is preferably provided before the mixture is obtained, and a solid-liquid separation step of performing solid-liquid separation after the washing with water is preferably provided for adjusting the water content.

By providing the water washing step, the amount of lithium present in the water in the mixture is reduced, so that the control of the Li molar ratio can be facilitated.

The water washing conditions in the water washing step need only to be such that the unreacted lithium compound can be sufficiently reduced, for example, to preferably 0.08 mass % or less, more preferably 0.05 mass % or less, with respect to the total amount of the lithium-metal composite oxide particles, and when obtaining the slurry, the concentration of the lithium-metal composite oxide powder contained in the slurry is preferably set to 200 to 5000 g with respect to 1 L of the water in stirring.

When the concentration of the lithium-metal composite oxide powder is set to this range, the unreacted lithium compound can be more sufficiently reduced, while the deterioration due to the elution of lithium from the lithium-metal composite oxide particles is suppressed.

The water washing time and the water washing temperature also may be set to ranges so as to allow the unreacted lithium compound to be sufficiently reduced. For example, the water washing time is preferably in the range of 5 to 60 minutes, and the water washing temperature is preferably in the range of 10 to 40° C.

In the present invention, the step of adding the tungsten compound is not limited as long as the mixture as described above is obtained, but in the case where the water washing step is provided, the mixing step is preferably finished after the water washing step. If the mixture is obtained before the water washing step, the tungsten compound is washed away by the washing with water, and therefore the amount of tungsten in the mixture may fall short.

Accordingly, in the case where the water washing step is provided, a specific mixture is preferably obtained by adding the tungsten compound at least either during the water washing step or after the solid-liquid separation step.

In the case where the tungsten compound is added during the water washing step, the tungsten compound may be added in advance to the water that is mixed with the lithium-metal composite oxide powder to obtain an aqueous solution or a suspension, or may be added after obtaining the slurry. Further, for facilitating the control of the total amount of lithium, the tungsten compound is preferably totally dissolved in the slurry in the washing with water. Further, it is preferable to use a tungsten compound poorly soluble in water or a compound free from lithium.

These compounds enable the influence by lithium dissolved from the solid tungsten compound in the mixture to be reduced and the total amount of lithium in the mixture to be easily controlled.

Meanwhile, also in the case of adding the tungsten compound after the solid-liquid separation step, the tungsten compound may be in the form of either an aqueous solution or a powder. In the case of adding it after the solid-liquid separation step, the control of the Li molar ratio is facilitated, since lithium and tungsten that are removed together with liquid component do not exist, and the entire tungsten compound remains in the mixture.

Further, when adding the tungsten compound during the water washing step, the tungsten compound may be in the form of either an aqueous solution or a powder, and a uniform mixture is obtained by adding the tungsten compound to the slurry followed by stirring.

In the case of using an aqueous solution of the tungsten compound or a water-soluble compound for the tungsten compound used, the tungsten compound dissolved in the slurry in the solid-liquid separation step after the washing with water is removed together with the liquid component of the slurry. However, the amount of tungsten in the mixture can be made sufficient by the tungsten dissolved in the water in the mixture.

Depending on the water washing conditions and the solid-liquid separation conditions, the amount of tungsten in the mixture is allowed to be stable together with the water content, and therefore these conditions may be determined by preliminary tests together with the type and the amount of the tungsten compound to be added.

The total amount of lithium contained in the water and the tungsten compound (which will be hereinafter referred to as total amount of lithium) with respect to the tungsten in the mixture also can be determined by preliminary tests in the same manner as in the amount of tungsten.

The amount of tungsten in the mixture when adding the tungsten compound in the water washing step can be determined by ICP emission spectroscopy. Further, the amount of lithium contained in the water in the mixture can be determined from the analysis value of lithium in the liquid component separated by the solid-liquid separation after the washing with water by ICP emission spectroscopy and the water content.

Meanwhile, the amount of lithium contained in the solid tungsten compound in the mixture can be determined from the tungsten compound remaining as a solid component by adding the tungsten compound into a lithium hydroxide aqueous solution at the same concentration as the liquid component after the washing with water followed by stirring under the same conditions as in the washing with water, and calculating the amount remaining as a solid component in the mixture from the ratio of the tungsten compound remaining as a residue.

Further, the amount of tungsten contained in the mixture when adding the tungsten compound after the solid-liquid separation step can be determined from the amount of the tungsten compound to be added. Meanwhile, the total amount of lithium in the mixture may be calculated as the sum of the amount of lithium contained in the water determined from the analysis value of lithium in the liquid component separated by the solid-liquid separation after the washing with water by ICP emission spectroscopy and the water content, and the amount of lithium determined from the tungsten compound to be added, or the amount of the tungsten compound and the amount of the lithium compound.

When adding the tungsten compound as an aqueous solution after the solid-liquid separation step, the aqueous solution needs to be adjusted as described above so that the water content is preferably not more than 20 mass %, and the tungsten concentration is preferably set to 0.05 to 2 mol/L.

Thus, a necessary amount of tungsten can be added, while the water content in the mixture is regulated. When the water content exceeds 20 mass %, the water content may be adjusted again by solid-liquid separation, where however the Li molar ratio in the mixture needs to be checked by determining the amount of tungsten and the amount of lithium in the removed liquid component.

For adjusting the water content in the mixture to 2 mass % or more, the mixing after the solid-liquid separation step is preferably performed at a temperature of 50° C. or less. When the temperature exceeds 50° C., the water content may fall below 2 mass % due to drying during the mixing.

The device to be used for the mixing with the tungsten compound is not limited as long as it is capable of uniform mixing, and a common mixer can be used therefor. For example, the mixing with the tungsten compound may be performed sufficiently to an extent such that the shape of the lithium-metal composite oxide particles is not broken, using a shaker mixer, a Loedige mixer, a Julia mixer, a V blender, or the like.

In the production method of the present invention, since the composition of the positive electrode active material to be obtained is composed only of tungsten that is increased by being added from the lithium-metal composite oxide as a base material in the mixing step and lithium that is added as needed, a known lithium-metal composite oxide having a composition represented by the formula $Li_zNi_{1-x-y}Co_xM_yO_2$ (where $0<x\leq0.35$, $0\leq y\leq0.35$, and $0.95\leq z\leq1.25$ are satisfied, and M is at least one element selected from Mn, V, Mg, Mo, Nb, Ti, and Al) is used for the lithium-metal composite oxide as a base material, for achieving high capacity and low reaction resistance.

Meanwhile, in the case of washing with water, the ratio Li/Me (which corresponds to z in the formula) decreases due to the elution of lithium during the washing with water. Therefore, after the decrement is checked in advance by preliminary tests, a lithium-metal composite oxide having an adjusted ratio Li/Me may be used as a material before the washing with water. The decrement in the ratio Li/Me under the general water washing conditions is about 0.03 to 0.08.

Further, also when the water is supplied in the mixing step, lithium is eluted though it is a small amount. Accordingly, z representing the ratio Li/Me in the lithium-metal composite oxide as a base material is $0.95\leq z\leq1.30$, preferably $0.97\leq z\leq1.20$.

Further, since it is advantageous to increase the contact area with the electrolyte for improving the output characteristics, it is preferable to use a lithium-metal composite oxide powder which is constituted by primary particles and secondary particles formed by aggregation of the primary particles and which has voids and grain boundaries through which the electrolyte can penetrate in the secondary particles.

[Heat Treatment Step]

The heat treatment step is a step of heat-treating the produced mixture.

This allows lithium tungstate to be formed from lithium and tungsten contained in the water in the mixture on the surface of the primary particles of the lithium-metal composite oxide, so that a positive electrode active material for nonaqueous electrolyte secondary batteries is obtained.

The heat treatment method is not specifically limited as long as the LWO is formed, but the heat treatment is preferably performed at a temperature of 100 to 600° C. in an oxidizing atmosphere such as an oxygen atmosphere or a vacuum atmosphere, while avoiding a reaction with water and carbonic acid in the atmosphere, for preventing the deterioration in electrical properties when used as a positive electrode active material for nonaqueous electrolyte secondary batteries.

When the heat treatment temperature is less than 100° C., the water is not sufficiently evaporated, which may result in failure to sufficiently form the LWO. Meanwhile, when the heat treatment temperature exceeds 600° C., the primary particles of the lithium-metal composite oxide are fired, and the tungsten partially forms a solid solution in the layered structure of the lithium-metal composite oxide, which may reduce the charge-discharge capacity of the battery.

Meanwhile, when the tungsten compound contained in the mixture remains as a solid material, particularly, in the case where the tungsten compound is added as powder after the solid-liquid separation step, the rate of temperature increase is preferably set to 0.8 to 1.2° C./minute, until the powder is sufficiently dissolved, for example, until the temperature exceeds 90° C. Also in the mixing step, the tungsten compound powder is dissolved in the water in the mixture, but setting the rate of temperature increase as above allows the solid tungsten compound to be sufficiently dissolved during the temperature rise so as to penetrate into the surface of the primary particles inside the secondary particles.

When dissolving the solid tungsten compound, the heat treatment is preferably performed in a sealed container so that the water is not volatilized until the compound is sufficiently dissolved.

The heat treatment time is not specifically limited but is preferably 3 to 20 hours, more preferably 5 to 15 hours, for sufficiently evaporating the water in the mixture to form the LWO.

(3) Nonaqueous Electrolyte Secondary Battery

The nonaqueous electrolyte secondary battery of the present invention is constituted by a positive electrode, a negative electrode, a nonaqueous electrolyte, etc., and constituted by the same components as those of common nonaqueous electrolyte secondary batteries. The embodiment described below is just an example, and the nonaqueous electrolyte secondary battery of the present invention can be implemented by employing embodiments in which various changes and improvements are made, using the embodiment shown in this description as a base, based on the knowledge of those skilled in the art. Further, the applications of the nonaqueous electrolyte secondary battery of the present invention are not specifically limited.

(a) Positive Electrode

Using the positive electrode active material for nonaqueous electrolyte secondary batteries described above, the positive electrode of the nonaqueous electrolyte secondary battery is produced, for example, as follows.

First, a positive electrode active material in powder form, a conductive material, and a binder are mixed, and activated carbon and a solvent for its intended purpose such as a viscosity adjuster are further added, as needed, and the mixture is kneaded to produce a positive electrode composite material paste.

The mixing ratio of each component in the positive electrode composite material paste is also an important element to determine the performance of the nonaqueous electrolyte secondary battery. When the total mass of the solid contents of the positive electrode composite material excluding the solvent is taken as 100 parts by mass, it is desirable that the content of the positive electrode active material be 60 to 95 parts by mass, the content of the conductive material be 1 to 20 parts by mass, and the content of the binder be 1 to 20 parts by mass, as in a positive electrode of a common nonaqueous electrolyte secondary battery.

The obtained positive electrode composite material paste, for example, is applied to the surface of a current collector made of aluminum foil, followed by drying, to disperse the solvent. In order to enhance the electrode density, it may be pressed by roll pressing or the like, as needed.

Thus, a positive electrode in sheet form can be produced. The positive electrode in sheet form can be used for producing a battery, for example, by being cut into a suitable size corresponding to the intended battery. However, the method for producing the positive electrode is not limited to the aforementioned example, and another method may be employed.

For producing the positive electrode, graphite (such as natural graphite, artificial graphite, and expanded graphite) and carbon black materials such as acetylene black and Ketjen Black®, for example, can be used as the conductive material.

The binder serves to hold the active material particles, for which polyvinylidene fluoride (PVDF), polytetrafluoroethylene (PTFE), fluororubber, ethylene propylene diene rubber, styrene butadiene, cellulose resins, and polyacrylic acid, for example, can be used.

As needed, the positive electrode active material, the conductive material, and the activated carbon are dispersed, and a solvent to dissolve the binder is added to the positive electrode composite material. Specifically, an organic solvent such as N-methyl-2-pyrrolidone can be used as the solvent.

(b) Negative Electrode

As the negative electrode, a material formed by applying a negative electrode composite material formed into a paste by mixing the binder with metal lithium, lithium alloy, or the like, or a negative electrode active material capable of absorbing and desorbing lithium ions and adding a suitable solvent onto the surface of the current collector made of a metal foil such as copper, followed by drying and compressing for increasing the electrode density, as needed, is used.

As the negative electrode active material, a powder material of natural graphite, artificial graphite, a fired material of an organic compound such as a phenolic resin, and a carbon material such as cokes, for example, can be used. In this case, a fluorine-containing resin such as PVDF can be used as the negative electrode binder, as in the positive electrode, and an organic solvent such as N-methyl-2-pyrrolidone can be used as the solvent to disperse the active material and the binder therein.

(c) Separator

A separator is interposed between the positive electrode and the negative electrode. The separator separates the positive electrode and the negative electrode from each other and holds the electrolyte. A thin film of polyethylene, polypropylene, or the like having a large number of fine holes can be used as the separator.

(d) Non-Aqueous Electrolyte

The nonaqueous electrolyte is formed by dissolving a lithium salt as a supporting salt in an organic solvent.

As the organic solvent, one selected from cyclic carbonates such as ethylene carbonate, propylene carbonate, butylene carbonate, and trifluoropropylene carbonate, chain carbonates such as diethyl carbonate, dimethyl carbonate, ethyl methyl carbonate, and dipropyl carbonate, ether compounds such as tetrahydrofuran, 2-methyltetrahydrofuran, and dimethoxyethane, sulfur compounds such as ethyl methyl sulfone and butanesulton, and phosphorus compounds such as triethyl phosphate and trioctyl phosphate can be used alone, or two or more of these can be mixed for use.

As the supporting salt, $LiPF_6$, $LiBF_4$, $LiCO_4$, $LiAsF_6$, and $LiN(CF_3SO_2)_2$, and composite salts of these can be used.

Further, the non-aqueous electrolyte may contain a radical scavenger, a surfactant, a flame retardant, and the like.

(e) Shape and Configuration of Battery

The nonaqueous electrolyte secondary battery of the present invention constituted by the positive electrode, the negative electrode, the separator, and the non-aqueous electrolyte described above can have various shapes such as a cylindrical type and a stacked type.

Even if any shape is employed, an electrode body is obtained by stacking the positive electrode and the negative electrode via the separator, the obtained electrode body is impregnated with the non-aqueous electrolyte, the connection between the positive electrode current collector and the positive electrode terminal connected to the outside and the connection between the negative electrode current collector and the negative electrode terminal connected to the outside are established using leads for the current collectors, and the components are sealed in a battery case, to complete the nonaqueous electrolyte secondary battery.

(f) Characteristics

The nonaqueous electrolyte secondary battery using the positive electrode active material of the present invention has high capacity and high power.

In particular, the nonaqueous electrolyte secondary battery obtained by a further preferable embodiment using the positive electrode active material according to the present invention, for example, when used as a positive electrode of a 2032-type coin battery, has a high initial discharge capacity of 165 mAh/g or more and a low positive electrode resistance and further has high capacity and high power. Further, it also has high thermostability and excellent safety.

In the method for measuring the positive electrode resistance in the present invention, when the frequency dependence of a battery reaction is measured by a common AC impedance method as an electrochemical evaluation technique, a Nyquist diagram based on the solution resistance, the negative electrode resistance and the negative electrode capacity, and the positive electrode resistance and the positive electrode capacity is obtained as shown in FIG. 1.

The battery reaction in an electrode is made by the resistance components following charge transfers and the capacity components by an electric double layer. When these components are shown as an electrical circuit, a parallel circuit of the resistance and the capacity is obtained, and they are shown as an equivalent circuit in which the solution resistance and the parallel circuit of the negative electrode and the positive electrode are connected in series as the entire battery. The Nyquist diagram determined is subjected to fitting calculation using the equivalent circuit, and the resistance components and the capacity components each can be estimated. The positive electrode resistance is equal to the diameter of a semicircle on the low frequency side of the Nyquist diagram to be obtained.

From above, the positive electrode resistance can be estimated by performing the AC impedance measurement on the produced positive electrode and subjecting the obtained Nyquist diagram to fitting calculation using the equivalent circuit.

EXAMPLES

For a secondary battery having a positive electrode using the positive electrode active material obtained by the present invention, the performance (such as initial discharge capacity and positive electrode resistance) was measured.

Hereinafter, the present invention will be specifically described by way of examples, but the present invention is not limited to these examples at all.

(Production and Evaluation of Battery)

For evaluating the initial discharge capacity and the positive electrode resistance of the positive electrode active material, a 2032-type coin battery 1 (which will be hereinafter referred to as coin type battery) shown in FIG. 2 was used.

Figure 2:
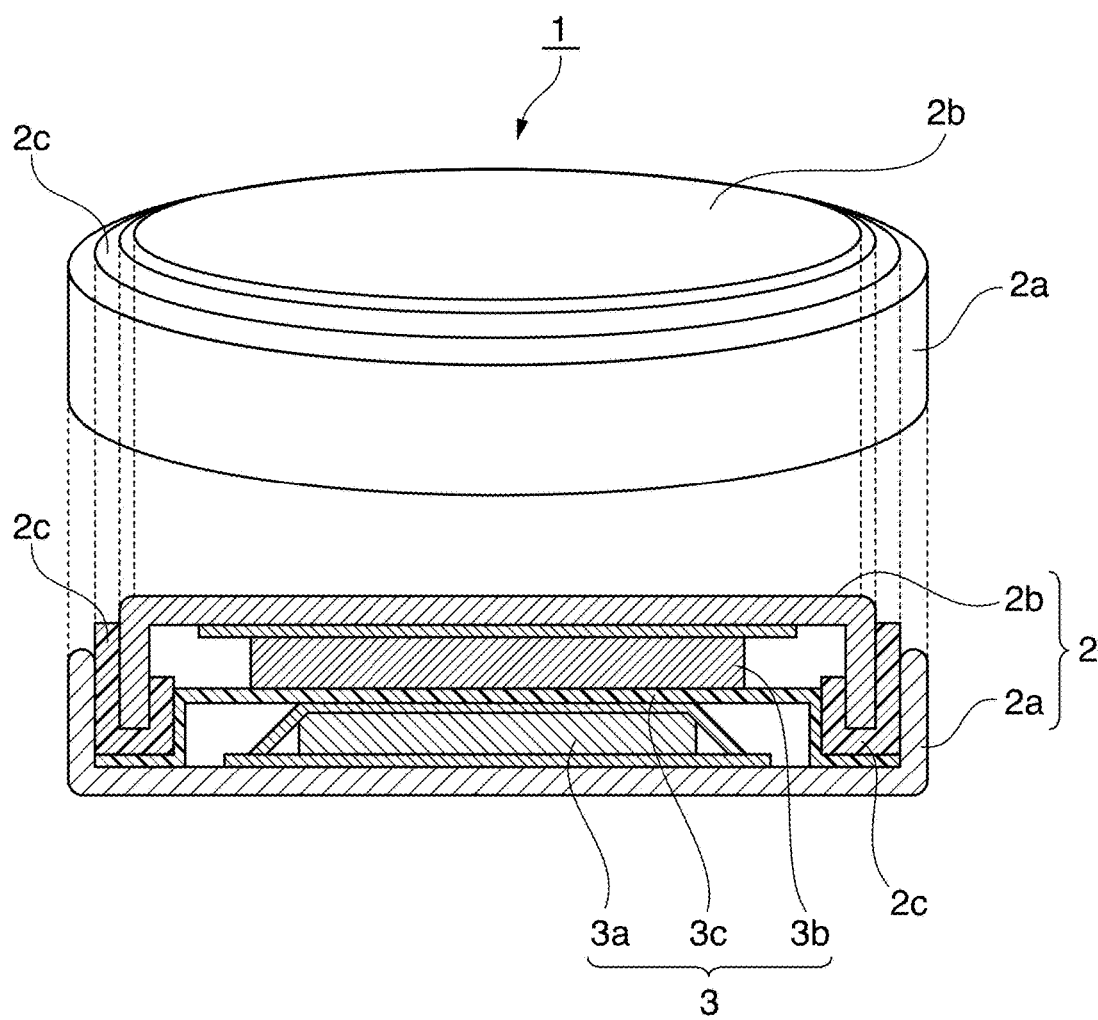
FIG. 2 is a schematic sectional view of a 2032-type coin battery 1 used for battery evaluation.

As shown in FIG. 2, the coin type battery 1 is constituted by a case 2 and electrodes 3 housed in the case 2.

The case 2 has a hollow positive electrode can 2a with one end open and a negative electrode can 2b arranged in the opening of the positive electrode can 2a, and is configured so that, when the negative electrode can 2b is arranged in the opening of the positive electrode can 2a, a space to house the electrodes 3 is formed between the negative electrode can 2b and the positive electrode can 2a. The electrodes 3 are constituted by a positive electrode 3a, a separator 3c, and a negative electrode 3b, which are stacked to be aligned in this order and are housed in the case 2 so that the positive electrode 3a is in contact with the inner surface of the positive electrode can 2a, and the negative electrode 3b is in contact with the inner surface of the negative electrode can 2b.

The case 2 includes a gasket 2c, and the relative movement between the positive electrode can 2a and the negative electrode can 2b is fixed by the gasket 2c so that the non-contact state is maintained. Further, the gasket 2c also has a function of sealing the gap between the positive electrode can 2a and the negative electrode can 2b so as to block between the inside and the outside of the case 2 air-tightly and liquid-tightly.

The coin type battery 1 shown in FIG. 2 was fabricated as follows.

First, 52.5 mg of the positive electrode active material for nonaqueous electrolyte secondary batteries, mg of acetylene black, and 7.5 mg of polytetrafluoroethylene resin (PTFE) were mixed, followed by press molding at a pressure of 100 MPa to a diameter of 11 mm and a thickness of 100 μm,to produce the positive electrode 3a. The thus produced positive electrode 3a was dried in a vacuum dryer at 120° C. for 12 hours.

Using the positive electrode 3a, the negative electrode 3b, the separator 3c, and the electrolyte, the coin type battery 1 shown in FIG. 2 was produced in a glove box under Ar atmosphere with the dew point controlled to −80° C.

As the negative electrode 3b, a negative electrode sheet in which graphite powder with an average particle size of about 20 μm and polyvinylidene fluoride were applied to a copper foil and which was punched into a disk shape with a diameter of 14 mm was used.

As the separator 3c, a polyethylene porous film with a film thickness of 25 nm was used.

As the electrolyte, an equal mixture (manufactured by TOMIYAMA PURE CHEMICAL INDUSTRIES, LTD.) of ethylene carbonate (EC) and diethyl carbonate (DEC) with 1 M LiClO$_4$ serving as a supporting electrolyte was used.

The initial discharge capacity and the positive electrode resistance showing the performance of the thus produced coin type battery 1 were evaluated as follows.

The capacity when the coin type battery 1 allowed to stand for about 24 hours from the fabrication was charged, with the current density with respect to the positive electrode set to 0.1 mA/cm$^2$, to a cut-off voltage of 4.3 V after the OCV (Open Circuit Voltage) became stable, followed by a pause for one hour, and was discharged to a cut-off voltage of 3.0 V was taken as the initial discharge capacity.

The Nyquist plot shown in FIG. 1 is obtained by charging the coin type battery 1 at a charge potential of 4.1 V and measuring the positive electrode resistance using a frequency response analyzer and a potentio-galvanostat (1255B, manufactured by Solartron) by the AC impedance method. Since the Nyquist plot is shown as the sum of characteristic curves showing the solution resistance, the negative electrode resistance and the capacity thereof, and the positive electrode resistance and the capacity thereof, fitting calculation was performed based on the Nyquist plot using the equivalent circuit to calculate the value of the positive electrode resistance.

Figure 4:
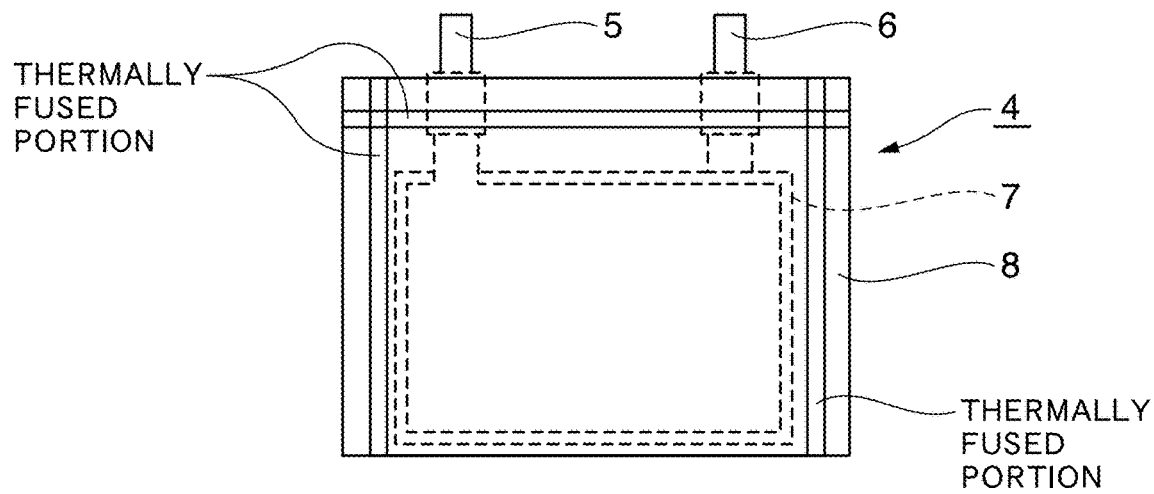
FIG. 4 is a schematic illustration of a laminated cell 4 used for battery evaluation.

For evaluating the gas generation of the positive electrode active material, a laminated cell 4 shown in the schematic illustration of FIG. 4 was used.

For producing the laminated cell 4, a positive electrode sheet 5 in which a positive electrode active material layer with a mass per unit area of the positive electrode active material of 7 mg/cm$^2$ was formed by applying a pasted positive electrode active material to an aluminum current collector foil (with a thickness of 0.02 mm) with a conductive unit connected to the outside left uncoated, followed by drying, was produced.

Further, a negative electrode sheet 6 in which a negative electrode active material layer with a mass per unit area of the negative electrode active material of 5 mg/cm$^2$ was formed by applying a pasted carbon powder (acetylene black) in the same manner as above to a copper current collector foil (with a thickness of 0.02 mm) as a negative electrode active material was produced.

A separator 7 constituted by a polypropylene microporous film (with a thickness of 20.7 μm and a void fraction density of 43.9%) was interposed between the positive electrode sheet 5 and the negative electrode sheet 6 produced above to form a laminated sheet. Then, the laminated sheet was sandwiched by two pieces of aluminum laminated sheets 8 (with a thickness of 0.05 mm), and three sides of the aluminum laminated sheets were thermally fused to be sealed, so that the laminated cell with the configuration as shown in FIG. 4 was assembled.

Thereafter, 260 μl of an electrolyte manufactured by Ube Industries, Ltd. in which LiPF$_6$ (1 mol/L) and cyclohexyl benzene (2 wt %) were dissolved in a mixed solvent of ethylene carbonate, ethyl methyl carbonate, and dimethyl carbonate (volume ratio 3:3:4) was injected, and the remaining one side was thermally fused, to produce the laminated cell 4 shown in FIG. 4 for the gas generation test to evaluate the gas generation. The produced laminated cell 4 had a size with a length of 60 mm and a width of 90 mm.

(Gas Generation Test)

The produced laminated cell 4 was stored for 12 hours in a thermostatic bath (COSMOPIA) manufactured by Hitachi Appliances, Inc. set at 25° C.

While the laminated cell 4 was housed in the thermostatic bath after the laminated cell 4 was stored for 12 hours, charge and discharge were performed three times in a 0.2 C constant current mode within the range of 3.0 to 4.3 V, using a charge-discharge device (HJ1001SD8, manufactured by HOKUTO DENKO CORPORATION). After the charge and discharge, the laminated cell 4 was charged to 4.6 V in a 1 C constant current mode and then was allowed to stand in a thermostatic bath for 72 hours, so that gas was generated in the laminated cell 4.

At this time, the laminated cell 4 was held by being sandwiched between a pair of plate members (made of stainless steel), and a width of 1 cm from the end of the laminated cell was exposed from the pair of plate members to serve as an exposed portion.

(Evaluation of Amount of Generated Gas)

The tested laminated cell 4a that had undergone the gas generation test (which will be hereinafter referred to as tested laminated cell) was taken out of the thermostatic bath, and a mark was made at a width of 1 cm from the end of the tested laminated cell 4a using a permanent marker.

Thereafter, the tested laminated cell 4a was placed on a table T of a manual hydraulic press machine PA4 (model number: TB-50H, manufactured by NPa SYSTEM CO., LTD.) as shown in the schematic illustration of the method for evaluating the gas generation in FIG. 5, and a rectangular parallelepiped pressing plate (made of stainless steel) serving as a pressing member PP was placed on the tested laminated cell 4a with a width of 1 cm from the end (an unpressed part UPA with a width $L_1$, which is a portion from the marked portion to the end of the tested laminated cell 4a) left.

Further, a rectangular parallelepiped measuring plate (made of stainless steel) serving as a mounting member MP was arranged on the unpressed part UPA, and a dial gauge Ga (2A-104, manufactured by CITIZEN FINEDEVICE CO., LTD.) was installed on the upper surface of one end (portion placed on the unpressed part) of the measuring plate.

Figure 5:
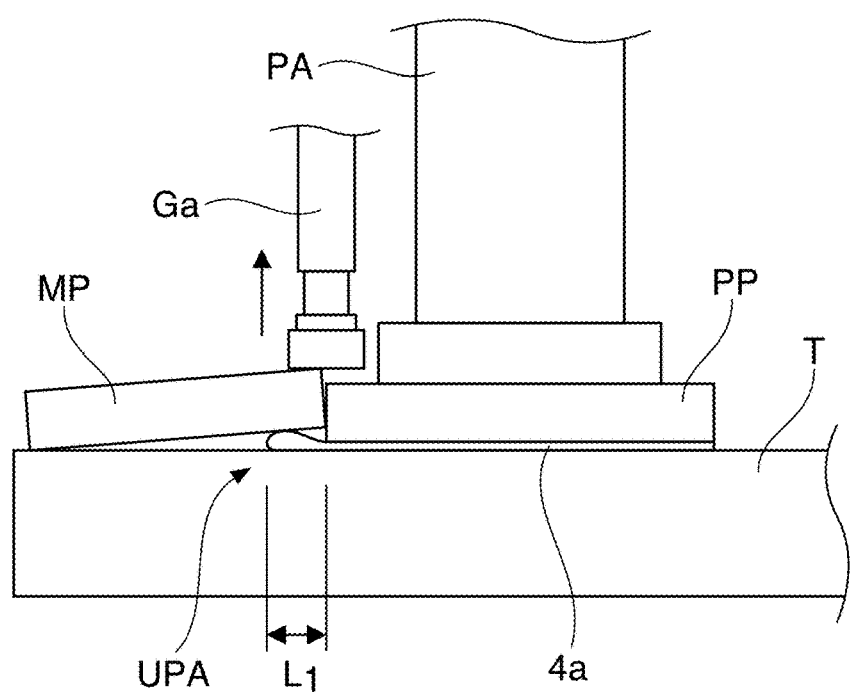
FIG. 5 is a schematic illustration showing a method for evaluating a gas generation in which the laminated cell 4 is pressed by a hydraulic press machine PA.

Thereafter, the pressing member PP was pressed by the manual hydraulic press machine PA as shown in FIG. 5 to apply a pressure of 4 kN to the tested laminated cell 4a, so that the gases inside the tested laminated cell 4a are collected to the unpressed part UPA. The unpressed part UPA was inflated by the collected gases, and one end of the mounting member MP moved upward.

Finally, the amount of movement of the one end of the mounting member MP was measured by reading the value of the dial gauge Ga, to evaluate the amount of the generated gas.

In the present examples, the positive electrode active material, and the secondary battery, the respective samples of special reagents manufactured by Wako Pure Chemical Industries, Ltd. were used for producing the composite hydroxide.

Example 1

A powder of lithium-metal composite oxide particles represented by Li$_{1.030}$Ni$_{0.82}$Co$_{0.15}$Al$_{0.03}$O$_2$ and obtained by a known technique of mixing an oxide powder containing Ni as a main component and lithium hydroxide followed by firing was used as a base material. The lithium-metal composite oxide powder had an average particle size of 12.4 μm and a specific surface area of 0.3 m$^2$/g. The average particle size was evaluated using a volume integrated average in the laser diffraction light-scattering method, and the specific surface area was evaluated using the BET method by nitrogen gas adsorption.

15.6 g of tungsten oxide ($WO_3$) was added into an aqueous solution in which 5.6 g of lithium hydroxide (LiOH) was dissolved in 100 ml of pure water, followed by stirring, to obtain an aqueous solution of a tungsten compound.

Next, 75 g of a lithium-metal composite oxide powder as a base material was immersed with the aqueous solution, followed by further stirring for 10 minutes, to be sufficiently mixed, and the lithium-metal composite oxide powder was washed with water at the same time. Thereafter, solid-liquid separation was performed thereon by suction filtration using a Buchner funnel, to obtain a tungsten-containing mixture composed of the lithium-metal composite oxide particles, the liquid component, and the tungsten compound.

The mixture was dried, and the water content determined from the mass before and after the drying was 7.6 mass % with respect to the lithium-metal composite oxide particles.

Further, as a result of analysis by ICP emission spectroscopy, the liquid component had a Li concentration of 2.62 mol/L, the mixture had a tungsten content of 0.0039 mol, and the Li molar ratio was 3.9.

The obtained mixture was put into a firing container made of stainless steel (SUS), and the temperature was raised in vacuum atmosphere at a rate of temperature increase of 2.8° C./minute up to 210° C. for heat treatment for 13 hours, followed by cooling to room temperature in the furnace.

Finally, a sieve with a mesh opening of 38 μm was applied for deagglomeration, to obtain a positive electrode active material having lithium tungstate on the surface of the primary particles.

As a result of analyzing the tungsten content and the ratio Li/Me in the obtained positive electrode active material by ICP emission spectroscopy, the composition was confirmed to be such that the atomic ratio of Ni:Co:Al was 82:15:3, and the tungsten content was 0.5 at % with respect to the total number of atoms of Ni, Co, and M, the ratio Li/Me was 0.994, and the ratio Li/Me in the core material was 0.992.

The ratio Li/Me was determined, using a lithium hydroxide solution containing Li at the same concentration as in the washing with water, by analyzing a lithium-metal composite oxide powder washed with water in the same conditions by ICP emission spectroscopy.

[Analysis of Lithium Tungstate and Excess Lithium]

The state of lithium tungstate in the obtained positive electrode active material was evaluated by titrating Li eluted from the positive electrode active material. Pure water was added to the obtained positive electrode active material, the resultant mixture was stirred for a certain time, and them filtrated to obtain a filtrate. Hydrochloric acid was added to the filtrate while measuring the pH until the point of neutralization emerged. When the state of a compound containing lithium eluted at the neutralization point was evaluated, the presence of $Li_4WO_5$ was confirmed in the lithium tungstate, and the proportion of $Li_4WO_5$ contained therein, as calculated, was 60 mol %.

Meanwhile, lithium tungstate was produced by mixing so that W in tungsten oxide and Li in lithium hydroxide had the same Li molar ratio (3.9), and the produced lithium tungstate was investigated by X-ray diffraction. As a result, only $Li_4WO_5$ and $Li_2WO_4$ were observed. Therefore, it was inferred that, in the lithium tungstate of the positive electrode active material, the proportion of $Li_4WO_5$ was 60 mol %, and the proportion of $Li_2WO_4$ was 40 mol %. Further, the excess lithium was 0.03 mass % with respect to the total amount of the positive electrode active material.

[Morphological Analysis of Lithium Tungstate]

The obtained positive electrode active material was embedded into a resin, and cross-section polishing was performed thereon to produce a sample for observation. The cross section of the sample was observed by SEM at 5000-fold magnification, and it was confirmed that the sample was constituted by primary particles and secondary particles formed by aggregation of the primary particles, fine particles of lithium tungstate were formed on the surface of the primary particles, and the fine particles had a particle size of 20 to 145 nm.

Further, it was confirmed that 90% of the number of the observed secondary particles had lithium tungstate formed on the surface of the primary particles, and the lithium tungstate was uniformly formed between the secondary particles.

Further, the vicinity of the surface of the primary particles of the obtained positive electrode active material was observed by a transmission electron microscope (TEM), and it was confirmed that coating films of lithium tungstate with a film thickness of 2 to 85 nm were formed on the surface of the primary particles, and the coating films were the lithium tungstate.

[Evaluation of Battery]

The battery characteristics of the coin type battery 1 shown in FIG. 2 having a positive electrode produced using the obtained positive electrode active material were evaluated. The positive electrode resistance was shown as a relative value, taking the evaluation value of Example 1 as 100. The initial discharge capacity was 204.6 mAh/g.

[Evaluation of Gas Generation]

Using the obtained positive electrode active material as a positive electrode material, the laminated cell 4 was produced, which was subjected to a gas generation test, to evaluate the gas generation. The gas generation was evaluated as a relative value, taking the evaluation of Example 1 as 100.

Hereinafter, for Examples 2 to 6 and Comparative Examples 1 to 5, only materials and conditions changed from those in Example 1 above are shown.

The results of the morphological analysis of the lithium tungstate and the evaluation values of the initial discharge capacity and the positive electrode resistance of Examples 1 to 6 and Comparative Examples 1 to 5 measured are shown in Table 1.

Example 2

A positive electrode active material for nonaqueous electrolyte secondary batteries was obtained in the same conditions as in Example 1 except that 3.5 g of LiOH and 10.5 g of $WO_3$ were used.

After drying the tungsten-containing mixture after the solid-liquid separation, the water content determined from the mass before and after the drying was 6.8 mass % with respect to the lithium-metal composite oxide particles.

Further, as a result of analysis by ICP emission spectroscopy, the Li concentration in the liquid component was 1.74 mol/L, the tungsten content in the tungsten-containing mixture was 0.0023 mol, and the Li molar ratio was 3.8.

As a result of analyzing the tungsten content and the ratio Li/Me in the obtained positive electrode active material by ICP emission spectroscopy, the composition was confirmed to be such that the tungsten content was 0.3 at % with respect to the total number of atoms of Ni, Co, and M, the ratio Li/Me was 0.994, and the ratio Li/Me in the core material was 0.992.

Further, as a result of titration analysis of the obtained positive electrode active material, the presence of $Li_4WO_5$ was confirmed in the lithium tungstate, and the proportion of $Li_4WO_5$ contained in the lithium tungstate, as calculated, was 60 mol %.

Meanwhile, lithium tungstate was produced by mixing so that W in tungsten oxide and Li in lithium hydroxide had the same Li molar ratio (3.8), and the produced lithium tungstate was investigated by X-ray diffraction. As a result, only $Li_4WO_5$ and $Li_2WO_4$ were observed. Therefore, it was inferred that, in the lithium tungstate of the positive electrode active material, the proportion of $Li_4WO_5$ was 60 mol %, and the proportion of $Li_2WO_4$ was 40 mol %.

Further, the excess lithium was 0.02 mass % with respect to the total amount of the positive electrode active material.

The morphological analysis and the evaluation of the lithium tungstate were performed in the same manner as in Example 1, and the evaluation results are shown in Table 1 together with the battery characteristics.

Example 3

A positive electrode active material for nonaqueous electrolyte secondary batteries was obtained in the same conditions as in Example 1 except that 7.0 g of LiOH and 19.3 g of $WO_3$ were used.

After drying the tungsten-containing mixture after the solid-liquid separation, the water content determined from the mass before and after the drying was 7.3 mass % with respect to the lithium-metal composite oxide particles.

Further, as a result of analysis by ICP emission spectroscopy, the Li concentration in the liquid component was 3.19 mol/L, the tungsten content in the mixture was 0.0046 mol, and the Li molar ratio was 3.8.

As a result of analyzing the tungsten content and the ratio Li/Me in the obtained positive electrode active material by ICP emission spectroscopy, the composition was confirmed to be such that the tungsten content was 0.6 at % with respect to the total number of atoms of Ni, Co, and M, the ratio Li/Me was 0.995, and the ratio Li/Me in the core material was 0.993.

Further, as a result of titration analysis of the obtained positive electrode active material, the presence of $Li_4WO_5$ was confirmed in the lithium tungstate, and the proportion of $Li_4WO_5$ contained in the lithium tungstate, as calculated, was 60 mol %.

Meanwhile, lithium tungstate was produced by mixing so that W in tungsten oxide and Li in lithium hydroxide had the same Li molar ratio (3.8), and the produced lithium tungstate was investigated by X-ray diffraction. As a result, only $Li_4WO_5$ and $Li_2WO_4$ were observed. Therefore, it was inferred that, in the lithium tungstate of the positive electrode active material, the proportion of $Li_4WO_5$ was 60 mol %, and the proportion of $Li_2WO_4$ was 40 mol %.

Further, the excess lithium was 0.04 mass % with respect to the total amount of the positive electrode active material.

The morphological analysis and the evaluation of the lithium tungstate were performed in the same manner as in Example 1, and the evaluation results are shown in Table 1 together with the battery characteristics.

Example 4

A positive electrode active material for nonaqueous electrolyte secondary batteries was obtained in the same conditions as in Example 1 except that 300 g of a lithium-metal composite oxide powder serving as a base material was immersed in 400 ml of pure water and was washed with water, 4.6 g of lithium hydroxide (LiOH) and 1.44 g of tungsten oxide ($WO_3$) were added thereto after the solid-liquid separation, followed by sufficient mixing using a shaker mixer (TURBULA Type T2C, manufactured by Willy A. Bachofen AG) at 30° C., to obtain a tungsten-containing mixture, and the temperature was raised at 1° C./minute until the temperature of the mixture reached 90° C. in the heat treatment step.

The tungsten-containing mixture was dried, and the water content determined from the mass before and after the drying was 7.5 mass % with respect to the lithium-metal composite oxide particles.

Further, as a result of analysis by ICP emission spectroscopy, the Li concentration in the liquid component during the solid-liquid separation was 0.31 mol/L, the tungsten content in the mixture was 0.062 mol, and the Li molar ratio was 3.2.

As a result of analyzing the tungsten content and the ratio Li/Me in the obtained positive electrode active material by ICP emission spectroscopy, the composition was confirmed to be such that the tungsten content was 2.0 at % with respect to the total number of atoms of Ni, Co, and M, the ratio Li/Me was 0.990, and the ratio Li/Me in the core material was 0.988.

Further, as a result of titration analysis of the obtained positive electrode active material, the presence of $Li_4WO$ was confirmed in the lithium tungstate, and the proportion of $Li_4WO$ contained in the lithium tungstate, as calculated, was 55 mol %.

Meanwhile, lithium tungstate was produced by mixing so that W in tungsten oxide and Li in lithium hydroxide had the same Li molar ratio (3.2), and the produced lithium tungstate was investigated by X-ray diffraction. As a result, only $Li_4WO_5$ and $Li_2WO_4$ were observed. Therefore, it was inferred that, in the lithium tungstate of the positive electrode active material, the proportion of $Li_4WO_5$ was 55 mol %, and the proportion of $Li_2WO_4$ was 45 mol %. Further, the excess lithium was 0.03 mass % with respect to the total amount of the positive electrode active material.

The morphological analysis and the evaluation of the lithium tungstate were performed in the same manner as in Example 1, and the evaluation results are shown in Table 1 together with the battery characteristics.

Example 5

A positive electrode active material for nonaqueous electrolyte secondary batteries was obtained in the same conditions as in Example 1 except that 300 g of a lithium-metal composite oxide powder serving as a base material was immersed in 400 ml of pure water and was washed with water, and an aqueous solution in which 31.2 g of lithium tungstate ($Li_4WO_5$) was dissolved in 400 ml of pure water was added while performing suction filtration as it was after the solid-liquid separation, to obtain a tungsten-containing mixture.

The tungsten-containing mixture was dried, and the water content determined from the mass before and after the drying was 6.4 mass % with respect to the lithium-metal composite oxide particles.

Further, as a result of analysis by ICP emission spectroscopy, the Li concentration in the liquid component during the solid-liquid separation after the addition of the lithium tungstate was 1.36 mol/L, the tungsten content in the mixture was 0.0065 mol, and the Li molar ratio was 4.0.

As a result of analyzing the tungsten content and the ratio Li/Me in the obtained positive electrode active material by ICP emission spectroscopy, the composition was confirmed to be such that the tungsten content was 0.2 at % with respect to the total number of atoms of Ni, Co, and M, the ratio Li/Me was 0.992, and the ratio Li/Me in the core material was 0.989.

Further, as a result of titration analysis of the obtained positive electrode active material, the presence of $Li_4WO_5$ was confirmed in the lithium tungstate, and the proportion of $Li_4WO_5$ contained in the lithium tungstate, as calculated, was 75 mol %.

Meanwhile, lithium tungstate was produced by mixing so that W in tungsten oxide and Li in lithium hydroxide had the same Li molar ratio (4.0), and the produced lithium tungstate was investigated by X-ray diffraction. As a result, only $Li_4WO$ and $Li_2WO_4$ were observed. Therefore, it was inferred that, in the lithium tungstate of the positive electrode active material, the proportion of $Li_4WO_5$ was 75 mol %, and the proportion of $Li_2WO_4$ was 25 mol %.

Further, the excess lithium was 0.02 mass % with respect to the total amount of the positive electrode active material.

The morphological analysis and the evaluation of the lithium tungstate were performed in the same manner as in Example 1, and the evaluation results are shown in Table 1 together with the battery characteristics.

Example 6

A positive electrode active material for nonaqueous electrolyte secondary batteries was obtained in the same manner as in Example 1 except that a powder of lithium-metal composite oxide particles represented by $Li_{1.175}Ni_{0.34}Co_{0.33}Mn_{0.33}O_2$, having an average particle size of 5.6 μm and a specific surface area of 0.7 m²/g, and obtained by a known technique of mixing an oxide powder constituted by Ni, Co, and Mn with lithium hydroxide followed by firing was used as a base material. The mixture after the solid-liquid separation was dried, and the water content determined from the mass before and after the drying was 7.8 mass % with respect to the lithium-metal composite oxide particles.

Further, as a result of analysis by ICP emission spectroscopy, the Li concentration in the liquid component was 2.24 mol/L, the tungsten content in the mixture was 0.0039 mol, and the Li molar ratio was 3.8.

As a result of analyzing the tungsten content and the ratio Li/Me in the obtained positive electrode active material by ICP emission spectroscopy, the composition was confirmed to be such that the tungsten content was 0.5 at % with respect to the total number of atoms of Ni, Co, and M, the ratio Li/Me was 1.146, and the ratio Li/Me in the core material was 1.144.

Further, as a result of titration analysis of the obtained positive electrode active material, the presence of $Li_4WO_5$ and $Li_2WO_4$ was confirmed in the lithium tungstate, and as a result of calculating the proportion of $Li_2WO_4$ contained in the lithium tungstate, it was inferred that the proportion of $Li_4WO_5$ was 60 mol %, and the proportion of $Li_2WO_4$ was 40 mol %.

Further, the excess lithium was 0.02 mass % with respect to the total amount of the positive electrode active material.

The morphological analysis and the evaluation of the lithium tungstate were performed in the same manner as in Example 1, and the evaluation results are shown in Table 1 together with the battery characteristics.

Comparative Example 1

A positive electrode active material for nonaqueous electrolyte secondary batteries was obtained in the same conditions as in Example 1 except that the washing with water was not performed in the aqueous solution of the tungsten compound but in pure water.

The ratio Li/Me in the obtained positive electrode active material, as analyzed by ICP emission spectroscopy, was 0.991. The excess lithium was 0.03 mass % with respect to the total amount of the positive electrode active material.

The morphological analysis and the evaluation of the lithium tungstate were performed in the same manner as in Example 1, and the evaluation results are shown in Table 1 together with the battery characteristics.

Comparative Example 2

A positive electrode active material for nonaqueous electrolyte secondary batteries was obtained in the same conditions as in Example 1 except that 9.5 g of LiOH and 15.6 g of $WO_3$ were used.

After drying the tungsten-containing mixture after the solid-liquid separation, the water content determined from the mass before and after the drying was 7.6 mass % with respect to the lithium-metal composite oxide particles.

Further, as a result of analysis by ICP emission spectroscopy, the Li concentration in the liquid component was 4.22 mol/L, the tungsten content in the mixture was 0.0039 mol, and the Li molar ratio was 6.3.

As a result of analyzing the tungsten content and the ratio Li/Me in the obtained positive electrode active material by ICP emission spectroscopy, the composition was confirmed to be such that the tungsten content was 0.5 at % with respect to the total number of atoms of Ni, Co, and M, the ratio Li/Me was 0.996, and the ratio Li/Me in the core material was 0.993.

Further, as a result of titration analysis of the obtained positive electrode active material, the presence of $Li_4WO_5$ was confirmed in the lithium tungstate, and the proportion of $Li_4WO_5$ contained in the lithium tungstate, as calculated, was 95 mol %.

Meanwhile, lithium tungstate was produced by mixing so that W in tungsten oxide and Li in lithium hydroxide had the same Li molar ratio (6.3), and the produced lithium tungstate was investigated by X-ray diffraction. As a result, only $Li_4WO_5$ was observed. Therefore, it was inferred that, in the lithium tungstate of the positive electrode active material, the proportion of $Li_4WO_5$ was 95 mol %, and the proportion of $Li_2WO_4$ was 0 mol %.

Further, the excess lithium was 0.08 mass % with respect to the total amount of the positive electrode active material.

The morphological analysis and the evaluation of the lithium tungstate were performed in the same manner as in Example 1, and the evaluation results are shown in Table 1 together with the battery characteristics.

Comparative Example 3

A positive electrode active material for nonaqueous electrolyte secondary batteries was obtained in the same conditions as in Example 1 except that 4.0 g of LiOH and 15.6 g of $WO_3$ were used.

After drying the tungsten-containing mixture after the solid-liquid separation, the water content determined from the mass before and after the drying was 7.6 mass % with respect to the lithium-metal composite oxide particles.

Further, as a result of analysis by ICP emission spectroscopy, the Li concentration in the liquid component was 1.95 mol/L, the tungsten content in the mixture was 0.0039 mol, and the Li molar ratio was 2.9.

As a result of analyzing the tungsten content and the ratio Li/Me in the obtained positive electrode active material by ICP emission spectroscopy, the composition was confirmed to be such that the tungsten content was 0.5 at % with respect to the total number of atoms of Ni, Co, and M, the ratio Li/Me was 0.994, and the ratio Li/Me in the core material was 0.992.

Further, as a result of titration analysis of the obtained positive electrode active material, the presence of $Li_4WO_5$ was confirmed in the lithium tungstate, and the proportion of $Li_4WO_5$ contained in the lithium tungstate, as calculated, was 35 mol %.

Meanwhile, lithium tungstate was produced by mixing so that W in tungsten oxide and Li in lithium hydroxide had the same Li molar ratio (2.9), and the produced lithium tungstate was investigated by X-ray diffraction. As a result, only $Li_4WO_5$ and $Li_2WO_4$ were observed. Therefore, it was inferred that, in the lithium tungstate of the positive electrode active material, the proportion of $Li_4WO_5$ was 35 mol %, and the proportion of $Li_2WO_4$ was 65 mol %.

Further, the excess lithium was 0.02 mass % with respect to the total amount of the positive electrode active material.

The morphological analysis and the evaluation of the lithium tungstate were performed in the same manner as in Example 1, and the evaluation results are shown in Table 1 together with the battery characteristics.

Comparative Example 4

A positive electrode active material for nonaqueous electrolyte secondary batteries was obtained in the same conditions as in Example 1 except that the washing with water was not performed in the aqueous solution of the tungsten compound but in pure water, followed by solid-liquid separation and drying, and 15.1 g of lithium tungstate ($Li_4WO_5$) was added after the drying, followed by sufficient mixing and stirring using a shaker mixer (TURBULA Type T2C, manufactured by Willy A. Bachofen AG), and heat treatment. After the solid-liquid separation and the drying, the water content was less than 1.0 mass %.

As a result of analyzing the tungsten content and the ratio Li/Me in the obtained positive electrode active material by ICP emission spectroscopy, the composition was confirmed to be such that the tungsten content was 0.5 at % with respect to the total number of atoms of Ni, Co, and M, the ratio Li/Me was 0.992, and the ratio Li/Me in the core material was 0.991.

Further, as a result of titration analysis of the obtained positive electrode active material, the presence of $Li_4WO_5$ was confirmed in the lithium tungstate, the proportion of $Li_4WO_5$ contained in the lithium tungstate, as calculated, was 98 mol %, and the excess lithium was 0.03 mass % with respect to the total amount of the positive electrode active material.

From the observation by SEM and TEM, it was confirmed that the lithium tungstate deposited only on the surface of the positive electrode active material particles and was not present on the surface of the primary particles thereinside.

The morphological analysis and the evaluation of the lithium tungstate were performed in the same manner as in Example 1, and the evaluation results are shown in Table 1 together with the battery characteristics.

Comparative Example 5

A positive electrode active material for nonaqueous electrolyte secondary batteries was obtained in the same manner as in Example 6 except that the washing with water was performed while the aqueous solution of the tungsten compound was not used and was changed to pure water.

The ratio Li/Me in the obtained positive electrode active material, as analyzed by ICP emission spectroscopy, was 1.138.

The excess lithium was 0.04 mass % with respect to the total amount of the positive electrode active material.

The morphological analysis and the evaluation of the lithium tungstate were performed in the same manner as in Example 1, and the evaluation results are shown in Table 1 together with the battery characteristics.

TABLE 1

| | Water content in mixture [mass %] | Li molar ratio | W concentration in positive electrode active material [at %] | proportion of $Li_4WO_5$ [mol %] | Excess Li [mass %] | Compound on surface of primary particles Form | Particle size [nm] | Film thickness [nm] | Initial discharge capacity [mAh/g] | Positive electrode resistance | Gas generation |
|---|---|---|---|---|---|---|---|---|---|---|---|
| Example 1 | 7.6 | 3.9 | 0.5 | 60 | 0.03 | Thin film + Fine particles | 20-145 | 2-85 | 204.6 | 100 | 100 |
| Example 2 | 6.8 | 3.8 | 0.3 | 60 | 0.02 | Thin film | — | 1-65 | 205.5 | 116 | 95 |
| Example 3 | 7.3 | 3.8 | 0.6 | 60 | 0.04 | Thin film + Fine particles | 30-165 | 2-90 | 200.0 | 108 | 110 |
| Example 4 | 7.5 | 3.2 | 2.0 | 55 | 0.03 | Thin film + Fine particles | 20-185 | 2-120 | 199.8 | 112 | 120 |
| Example 5 | 6.4 | 4.0 | 0.2 | 75 | 0.02 | Thin film | — | 2-70 | 206.2 | 108 | 101 |
| Example 6 | 7.8 | 3.8 | 0.5 | 60 | 0.02 | Thin film + Fine particles | 20-140 | 2-70 | 170.1 | 70 | 65 |
| Comparative Example 1 | — | — | 0.0 | — | 0.03 | — | — | — | 198.2 | 235 | 62 |

TABLE 1-continued

|  | Water content in mixture [mass %] | Li molar ratio | W concentration in positive electrode active material [at %] | proportion of Li₄WO₅ [mol %] | Excess Li [mass %] | Compound on surface of primary particles | | | Initial discharge capacity [mAh/g] | Positive electrode resistance | Gas generation |
|---|---|---|---|---|---|---|---|---|---|---|---|
|  |  |  |  |  |  | Form | Particle size [nm] | Film thickness [nm] |  |  |  |
| Comparative Example 2 | 7.6 | 6.3 | 0.5 | 95 | 0.08 | Thin film + Fine particles | 20-160 | 2-90 | 199.3 | 105 | 157 |
| Comparative Example 3 | 7.6 | 2.9 | 0.5 | 35 | 0.02 | Thin film + Fine particles | 20-155 | 2-85 | 201.7 | 134 | 83 |
| Comparative Example 4 | <1.0 | 4.0 | 0.5 | 98 | 0.03 | — | — | — | 199.7 | 157 | 169 |
| Comparative Example 5 | — | — | 0.0 | — | 0.04 | — | — | — | 158.9 | 175 | 38 |

[Evaluation]

As is obvious from Table 1, the positive electrode active materials of Examples 1 to 6 were produced according to the present invention and therefore formed batteries having low positive electrode resistance, high initial discharge capacity as compared with Comparative Examples 1 and 5 in which the lithium tungstate was not formed, and excellent characteristics.

Figure 3:
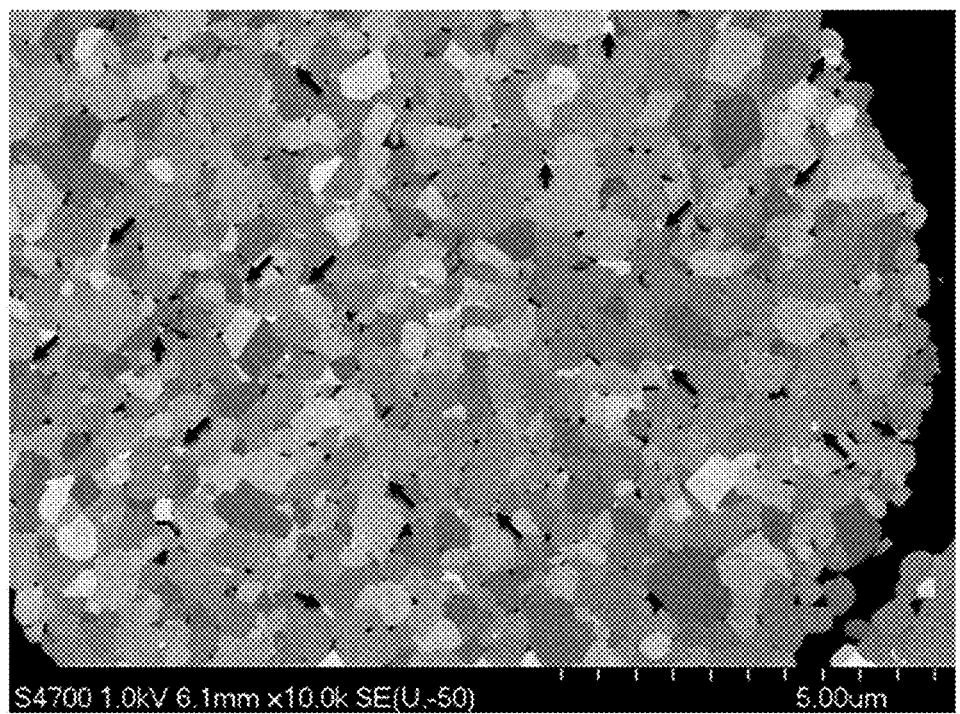
FIG. 3 is an example showing a cross-sectional observation result of a positive electrode active material obtained in an example using a scanning microscope.

Further, an example of the cross-sectional observation results of the positive electrode active material obtained in the examples of the present invention by a scanning microscope is shown in FIG. 3, where it was confirmed that the obtained positive electrode active material was constituted by primary particles and secondary particles formed by aggregation of the primary particles, and fine particles containing lithium tungstate were formed on the surface of the primary particles. The fine particles containing lithium tungstate are shown by arrows in FIG. 3.

Since no lithium tungstate was formed on the surface of the primary particles, Comparative Example 1 has considerably high positive electrode resistance, and thus it is difficult to meet the requirement to enhance the power.

In Comparative Examples 2 and 3, the amount of tungsten with respect to the number of atoms of Ni, Co, and M contained in the positive electrode active material was almost the same as in Example 1. However, since the ratio of Li₄WO₅ was large in Comparative Example 2, the gas generation was larger, though the positive electrode resistance was almost the same as in Examples. Meanwhile, since the ratio of Li₄WO₅ was small in Comparative Example 3, the positive electrode resistance was high, though the gas generation was small.

In Comparative Example 4, since the mixing with the tungsten compound was performed in a dry state, lithium tungstate was not formed on the surface of the primary particles inside the secondary particles, and the positive electrode resistance was high. Further, it is seen that, since lithium tungstate was Li₄WO₅, the gas generation was also large.

In Comparative Example 5, since lithium tungstate was not formed on the surface of the primary particles, the positive electrode resistance was considerably high, and thus it is difficult to meet the requirement to enhance the power.

The nonaqueous electrolyte secondary battery of the present invention is suitable for power sources of small portable electronic devices (such as laptop personal computers and mobile phone terminals) that constantly require high capacity and is suitable for batteries for electric cars that require high power.

Further, the nonaqueous electrolyte secondary battery of the present invention has excellent safety and allows size reduction and power enhancement, and therefore it is suitable as a power source for electric cars where there is a restriction on the mounting space. The present invention can be used not only as a power source for electric cars which are purely driven by electric energy but also as a power source for so-called hybrid vehicles that is used in combination with a combustion engine such as a gasoline engine and a diesel engine.

REFERENCE SIGNS LIST

1: Coin type battery
2: Case
2a: Positive electrode can
2b: Negative electrode can
2c: Gasket
3: Electrode
3a: Positive electrode
3b: Negative electrode
3c: Separator
4: Laminated cell
4a: Laminated cell after gas generation test
5: Positive electrode sheet
6: Negative electrode sheet
7: Separator
8: Aluminum laminated sheet
PA: Manual hydraulic press machine
UPA: Unpressed part
$L_1$: Width (of unpressed part)
PP: Pressing member
MP: Mounting member
Ga: Dial gauge
T: Table

The invention claimed is:

1. A positive electrode active material for nonaqueous electrolyte secondary batteries composed of a lithium-metal composite oxide powder having a layered crystal structure constituted by primary particles and secondary particles formed by aggregation of the primary particles, wherein the positive electrode active material is represented by a general formula: $Li_zNi_{1-x-y}Co_xM_yW_aO_{2+\alpha}$ (where $0<x\leq0.35$, $0\leq y\leq0.35$, $0.95\leq z\leq1.30$, $0<a\leq0.03$, and $0\leq\alpha\leq0.15$ are satisfied, and M is at least one element selected from Mn, V, Mg, Mo, Nb, Ti, and Al), and has lithium tungstate both in a form of fine particles and also in a form of a thin coating film on a surface of the primary particles of the lithium-metal composite oxide, the lithium tungstate contains at least $Li_4WO_5$ and $Li_2WO_4$, $Li_4WO_5$ is contained in the lithium tungstate at a proportion of 50 to 90 mol %, $Li_2WO_4$ is contained therein at a proportion of 10 to 50 mol %, and $Li_4WO_5$ and $Li_2WO_4$ are contained therein totally at a proportion of 90 mol % or more, and lithium contained in a lithium compound other than the lithium tungstate present on the surface of the lithium-metal composite oxide is an amount of more than 0 mass % and no more than 0.08 mass % with respect to a total amount of the positive electrode active material.

2. The positive electrode active material for nonaqueous electrolyte secondary batteries according to claim 1, wherein tungsten is contained in the lithium tungstate in an amount of 0.05 to 2.0 at % in terms of the number of W atoms with respect to the total number of atoms of Ni, Co, and M contained in the lithium-metal composite oxide.

3. The positive electrode active material for nonaqueous electrolyte secondary batteries according to claim 1, wherein the lithium tungstate is present on the surface of the primary particles of the lithium-metal composite oxide in both forms of fine particles having a particle size of 1 to 200 nm and a coating film having a film thickness of 1 to 150 nm.

4. A nonaqueous electrolyte secondary battery comprising:

a positive electrode comprising the positive electrode active material for nonaqueous electrolyte secondary batteries according to claim 1.

5. The positive electrode active material for nonaqueous electrolyte secondary batteries according to claim 1, wherein the lithium contained in the lithium compound other than the lithium tungstate present on the surface of the lithium-metal composite oxide is in an amount of more than 0 mass % and no more than 0.05 mass % with respect to the total amount of the positive electrode active material.

* * * * *